US012709783B2

(12) United States Patent
Higuchi et al.

(10) Patent No.: US 12,709,783 B2
(45) Date of Patent: Aug. 18, 2026

(54) GALVANIZED STEEL SHEET AND MEMBER, AND METHOD OF PRODUCING SAME

(71) Applicant: JFE STEEL CORPORATION, Tokyo (JP)

(72) Inventors: Sho Higuchi, Tokyo (JP); Yoshiyasu Kawasaki, Tokyo (JP); Tatsuya Nakagaito, Tokyo (JP); Takako Yamashita, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 18/727,874

(22) PCT Filed: Oct. 12, 2022

(86) PCT No.: PCT/JP2022/038117
§ 371 (c)(1),
(2) Date: Jul. 10, 2024

(87) PCT Pub. No.: WO2023/145146
PCT Pub. Date: Aug. 3, 2023

(65) Prior Publication Data

US 2025/0084501 A1 Mar. 13, 2025

(30) Foreign Application Priority Data

Jan. 28, 2022 (JP) ................................ 2022-012350

(51) Int. Cl.
*C21D 9/46* (2006.01)
*B32B 15/01* (2006.01)
(Continued)

(52) U.S. Cl.
CPC .............. *C21D 9/46* (2013.01); *B32B 15/013* (2013.01); *B32B 15/04* (2013.01); *B32B 15/043* (2013.01); *B32B 15/18* (2013.01); *C21D 6/005* (2013.01); *C21D 6/008* (2013.01); *C21D 8/02* (2013.01); *C21D 8/0226* (2013.01); *C21D 8/0236* (2013.01); *C21D 8/0257* (2013.01); *C21D 8/0263* (2013.01); *C21D 8/0273* (2013.01); *C22C 38/001* (2013.01);
(Continued)

(58) Field of Classification Search
CPC ................ C21D 9/46; C21D 2211/001; C21D 2211/002; C21D 2211/004; C21D 2211/005; C21D 2211/008; C21D 6/005; C21D 6/008; C21D 8/0205; C21D 8/0226; C21D 8/0236; C21D 8/0257; C21D 8/0263; C21D 8/0273; C21D 8/02; B32B 15/013; B32B 15/04; B32B 15/043; B32B 15/18; B32B 2311/20; C22C 38/001; C22C 38/002; C22C 38/005; C22C 38/008; C22C 38/02; C22C 38/04; C22C 38/06; C22C 38/08; C22C 38/10; C22C 38/12; C22C 38/14; C22C 38/16; C22C 38/34; C22C 38/38; C22C 38/40; C22C 38/60; C22C 38/105; C22C 38/18; C22C 38/20; C22C 38/22; C22C 38/24; C22C 38/26; C22C 38/28; C22C 38/30; C22C 38/32; C22C 38/42; C22C 38/44; C22C 38/46; C22C 38/48; C22C 38/50; C22C 38/52; C22C 38/54; C22C 38/58; C23C 2/02; C23C 2/022; C23C 2/0224; C23C 2/06; C23C 2/26; C23C 2/28; C23C 2/29; C23C 2/40; C23C 2/522; C23C 30/00; C23C 30/005; Y10T 428/12951; Y10T 428/12972; Y10T 428/12799
See application file for complete search history.

(56) References Cited

U.S. PATENT DOCUMENTS

2010/0104891 A1 4/2010 Nakagaito et al.
2011/0036465 A1 2/2011 Kawasaki et al.
(Continued)

FOREIGN PATENT DOCUMENTS

EP 3896186 A1 10/2021
JP 2008231493 A 10/2008
(Continued)

OTHER PUBLICATIONS

Jan. 10, 2023, International Search Report issued in the International Patent Application No. PCT/JP2022/038117.
Jan. 24, 2025, the Extended European Search Report issued by the European Patent Office in the corresponding European Patent Application No. 22924003.1.
Nov. 26, 2025, Office Action issued by the Ministry of Intellectual Property in the corresponding Korean Patent Application No. 10-2024-7012929 with English language concise statement of relevance.

*Primary Examiner* — Michael E. La Villa
(74) *Attorney, Agent, or Firm* — KENJA IP LAW PC

(57) ABSTRACT

Provided is a galvanized steel sheet having high strength, excellent ductility, excellent strain hardenability in a low strain range, and excellent strain hardenability in a high strain range. A base steel sheet has a defined chemical composition and a steel microstructure as follows: area fraction of ferrite: 20.0% or more and 90.0% or less, area fraction of bainitic ferrite: 4.0 % or more and 60.0% or less, area fraction of tempered martensite: 20.0% or less (including 0%), area fraction of retained austenite: 3.0% or more, area fraction of fresh martensite: 20.0% or less (including 0%), $S_F$+$S_{BF}$: 55.0% or more and 95.0% or less, $S_{MA1}$: 4.0% or more, and $S_{MA2}$: 1.5% or more.

7 Claims, 2 Drawing Sheets

(51) Int. Cl.

| | |
|---|---|
| ***B32B 15/04*** | (2006.01) |
| ***B32B 15/18*** | (2006.01) |
| ***C21D 6/00*** | (2006.01) |
| ***C21D 8/02*** | (2026.01) |
| ***C21D 8/0221*** | (2026.01) |
| ***C21D 8/0247*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/10*** | (2006.01) |
| ***C22C 38/12*** | (2006.01) |
| ***C22C 38/14*** | (2006.01) |
| ***C22C 38/16*** | (2006.01) |
| ***C22C 38/18*** | (2006.01) |
| ***C22C 38/20*** | (2006.01) |
| ***C22C 38/22*** | (2006.01) |
| ***C22C 38/24*** | (2006.01) |
| ***C22C 38/26*** | (2006.01) |
| ***C22C 38/28*** | (2006.01) |
| ***C22C 38/30*** | (2006.01) |
| ***C22C 38/32*** | (2006.01) |
| ***C22C 38/34*** | (2006.01) |
| ***C22C 38/38*** | (2006.01) |
| ***C22C 38/40*** | (2006.01) |
| ***C22C 38/42*** | (2006.01) |
| ***C22C 38/44*** | (2006.01) |
| ***C22C 38/46*** | (2006.01) |
| ***C22C 38/48*** | (2006.01) |
| ***C22C 38/50*** | (2006.01) |
| ***C22C 38/52*** | (2006.01) |
| ***C22C 38/54*** | (2006.01) |
| ***C22C 38/58*** | (2006.01) |
| ***C22C 38/60*** | (2006.01) |
| ***C23C 2/00*** | (2006.01) |
| ***C23C 2/02*** | (2006.01) |
| ***C23C 2/06*** | (2006.01) |
| ***C23C 2/26*** | (2006.01) |
| ***C23C 2/28*** | (2006.01) |
| ***C23C 2/40*** | (2006.01) |
| ***C23C 30/00*** | (2006.01) |

(52) U.S. Cl.

CPC .......... *C22C 38/002* (2013.01); *C22C 38/005* (2013.01); *C22C 38/008* (2013.01); *C22C 38/02* (2013.01); *C22C 38/04* (2013.01); *C22C 38/06* (2013.01); *C22C 38/08* (2013.01); *C22C 38/10* (2013.01); *C22C 38/105* (2013.01); *C22C 38/12* (2013.01); *C22C 38/14* (2013.01); *C22C 38/16* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/30* (2013.01); *C22C 38/32* (2013.01); *C22C 38/34* (2013.01); *C22C 38/38* (2013.01); *C22C 38/40* (2013.01); *C22C 38/42* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C22C 38/58* (2013.01); *C22C 38/60* (2013.01); *C23C 2/02* (2013.01); *C23C 2/022* (2022.08); *C23C 2/0224* (2022.08); *C23C 2/06* (2013.01); *C23C 2/26* (2013.01); *C23C 2/28* (2013.01); *C23C 2/29* (2022.08); *C23C 2/40* (2013.01); *C23C 2/522* (2022.08); *C23C 30/00* (2013.01); *C23C 30/005* (2013.01); *B32B 2311/20* (2013.01); *C21D 2211/001* (2013.01); *C21D 2211/002* (2013.01); *C21D 2211/004* (2013.01); *C21D 2211/005* (2013.01); *C21D 2211/008* (2013.01); *Y10T 428/12799* (2015.01); *Y10T 428/12951* (2015.01); *Y10T 428/12972* (2015.01)

(56) References Cited

U.S. PATENT DOCUMENTS

| | | | | |
|---|---|---|---|---|
| 2013/0259734 | A1 | 10/2013 | Kakiuchi et al. | |
| 2016/0186298 | A1* | 6/2016 | Schulz .................... | C22C 38/06 148/537 |
| 2018/0023155 | A1 | 1/2018 | Takeda et al. | |
| 2019/0003009 | A1 | 1/2019 | Kawata et al. | |
| 2021/0002741 | A1 | 1/2021 | Yabu et al. | |
| 2021/0040588 | A1 | 2/2021 | Toda et al. | |
| 2022/0064754 | A1 | 3/2022 | Hasegawa et al. | |
| 2022/0090248 | A1 | 3/2022 | Yokoyama et al. | |
| 2024/0124964 | A1 | 4/2024 | Higuchi et al. | |
| 2025/0084501 | A1 | 3/2025 | Higuchi et al. | |

FOREIGN PATENT DOCUMENTS

| | | | |
|---|---|---|---|
| JP | 5223360 | B2 | 6/2013 |
| JP | 6326837 | B2 | 5/2018 |
| JP | 6418363 | B1 | 11/2018 |
| KR | 1020210100692 | A | 8/2021 |
| WO | 2012067160 | A1 | 5/2012 |
| WO | 2016136810 | A1 | 9/2016 |
| WO | 2017164346 | A1 | 9/2017 |
| WO | 2019186989 | A1 | 10/2019 |
| WO | 2020162556 | A1 | 8/2020 |

* cited by examiner

MA1
MA excluding MA1
Microstructure other than MA
2 μm

MA excluding MA2
MA2
Microstructure other than MA

GALVANIZED STEEL SHEET AND MEMBER, AND METHOD OF PRODUCING SAME

TECHNICAL FIELD

The present disclosure relates to a galvanized steel sheet, a member made from the galvanized steel sheet, and methods of producing same.

BACKGROUND

In recent years, enhancement of fuel efficiency of automobiles has become an important issue from the viewpoint of protecting the global environment. Therefore, there is a growing trend to reduce weight of automobile bodies by increasing strength and reducing thickness of steel sheets used as material of automobile members.

Further, in view of automotive body rust resistance, steel sheets used as material of automobile members are often galvanized. Therefore, development of galvanized steel sheets having high strength is also progressing.

As an example of a steel sheet used as a material of an automobile member, Patent Literature (PTL) 1 describes:

"A high strength hot-dip galvanized steel sheet having excellent formability, comprising: a chemical composition of steel containing, in mass %, C: 0.05% to 0.3%, Si: more than 0.60% to 2.0%, Mn: 0.50% to 3.50%, P: 0.003% to 0.100%, S: 0.010% or less, Al: 0.010% to 0.06%, and N: 0.007% or less, with the balance being Fe and inevitable impurity; and the steel sheet microstructure including ferrite at an area fraction of 20% or more, tempered martensite, tempered bainite, and bainite at a total area fraction of 10% or more, and ferrite, tempered martensite, tempered bainite, and bainite at a total area fraction of 90% or more, wherein standard deviation of nano-hardness is 1.50 GPa or less."

PTL 2 describes:

"A cold-rolled steel sheet comprising:

a chemical composition containing, in mass %,

C: more than 0.010% and less than 0.080%,

Si: more than 0.55% and 2.00% or less,

Mn: more than 1.50% and 3.50% or less, sol. Al: more than 0.10% and less than 1.00%, Nb: 0.001% or more and less than 0.100%, Ti: 0% to less than 0.10000, V: 0% to 0.50%, Cr: 0% to 1.0%

Mo: 0% to 0.50%,

B: 0% to 0.010%,

Ca: 0% to 0.010%,

Mg: 0% to 0.010%,

REM: 0% to 0.050%

Bi: 0% to 0.050%, with the balance being Fe and impurities, among the impurities, P, S and N are P: 0.10% or less, S: 0.010% or less, and N: 0.010% or less, and the metallic microstructure including ferrite as the main phase and retained austenite in a second phase, wherein the volume fraction of ferrite to the total microstructure is 79% or more, average grain size of ferrite is less than 5.0 μm, and the volume fraction of retained austenite to the total microstructure is more than 1.0% and less than 7.0% (excluding 3.0% or less)."

PTL 3 describes:

"a high strength steel sheet having excellent ductility and hole expansion formability, comprising a chemical composition containing, in mass %, C: 0.05% or more and 0.30% or less, Si: 0.05% or more and 6.00% or less, Mn: 1.50% or more and 10.00% or less, P: 0.000% or more and 0.100% or less, S: 0.000% or more and 0.010% or less, sol. Al: 0.010% or more and 1.000% or less, N: 0.000% or more and 0.010% or less, Ti: 0.000% or more and 0.200% or less, Nb: 0.000% or more and 0.200% or less, V: 0.000% or more and 0.200% or less, Cr: 0.000% or more and 1.000% or less, Mo: 0.000% or more and 1.000% or less, Cu: 0.000% or more and 1.000% or less, Ni: 0.000% or more and 1.000% or less, Ca: 0.0000% or more and 0.0100% or less, Mg: 0.0000% or more and 0.0100% or less, REM: 0.0000% or more and 0.0100% or less, Zr: 0.0000% or more and 0.010000 or less, W: 0.0000% or more and 0.0100% or less, B: 0.0000% or more and 0.0030% or less, with the balance being Fe and inevitable impurity, wherein the steel sheet microstructure, in area fractions, consists of ferrite: 15% or more and 80% or less, and hard microstructure consisting of any one of bainite, martensite, retained austenite, or any combination thereof: 20% or more and 85% or less in total, an area fraction of the largest consolidated ferrite region in a region at a depth from the surface of ⅜t to t/2, where t is steel sheet thickness, is 80% or more of the total ferrite area, and the two-dimensional isoperimetric constant of the largest consolidated ferrite region is 0.35 or less."

CITATION LIST

Patent Literature

PTL 1: JP 5223360 B2

PTL 2: JP 6326837 B2

PTL 3: JP 6418363 B1

SUMMARY

Technical Problem

Automobile members are often complex in shape, and the occurrence of forming defects such as cracks and wrinkles is a major problem when forming steel sheets into automobile members. Typically, forming defects are caused by strain localization. Therefore, steel sheets that are materials of automobile members are required to have not only high ductility to withstand deformation during forming, but also high strain hardenability to disperse strain. In particular, forming defects often occur after a steel sheet has been heavily deformed. Accordingly, a steel sheet is required to exhibit excellent strain hardenability over a wide strain range, and specifically, not only high strain hardenability in a low strain range, but also excellent strain hardenability in a high strain range.

Typically, as a steel sheet is strengthened, ductility and strain hardenability are reduced. Therefore, even with the current trend toward higher strength automobile members, steel sheets having tensile strength (hereinafter also referred to as TS) of less than 590 MPa are still used for some automobile members. Further, even when steel sheets having TS of 590 MPa or more are used, the current situation is that localization of strain is prevented by adding a forming process, for example.

The current situation calls for the development of a steel sheet having high strength, excellent ductility, and good strain hardenability in both low and high strain ranges.

The steel sheets described in PTL 1-3 do not combine high strength, excellent ductility, and excellent strain hardenability over a wide strain range, and in particular, no consideration is given to strain hardenability in the high strain range.

The present disclosure was developed in view of the above requirements, and it would be helpful to provide a galvanized steel sheet having high strength, excellent ductility, excellent strain hardenability in the low strain range, and excellent strain hardenability in the high strain range, together with an advantageous method of producing the galvanized steel sheet.

It would also be helpful to provide a member made from the galvanized steel sheet and a method of producing the member.

Here, high strength means that TS measured by tensile testing in accordance with Japanese Industrial Standard JIS Z 2241 satisfies the following expression.

$$590\ \text{MPa} \le TS$$

Excellent ductility means that elongation after fracture (hereinafter also referred to as T-E1) measured by tensile testing in accordance with JIS Z 2241 satisfies an expression below, depending on the TS measured by the tensile testing.

when 590 MPa≤TS<780 MPa, 32.0%≤T-E1 when 780 MPa≤TS<980 MPa, 22.0%≤T-E1 when 980 MPa≤TS, 16.0%≤T-E1

Excellent strain hardenability in the low strain range means that a strain hardening index measured by a two-point method in accordance with JIS Z 2253, with the strain range from 0.4×U-E1 to 0.8×U-E1, (hereinafter also referred to as $n_1$) satisfies an expression below, depending on the TS measured according to the tensile test above.

when 590 MPa≤TS<780 MPa, $0.200 \le n_1$ when 780 MPa≤TS<980 MPa, $0.180 \le n_1$ when 980 MPa≤TS, $0.120 \le n_1$ Here, U-E1 is uniform elongation measured by a tensile test in accordance with JIS Z 2241.

Excellent strain hardenability in the high strain range means that a strain hardening index measured by a two-point method in accordance with JIS Z 2253, with the strain range from 0.9×U-E1 to 0.95×U-E1, (hereinafter also referred to as $n_2$) satisfies an expression below, depending on the TS measured according to the tensile test above.

when 590 MPa≤TS<780 MPa, $0.180 \le n_2$ when 780 MPa≤TS<980 MPa, $0.140 \le n_2$ when 980 MPa≤TS, $0.090 \le n_2$ Here, U-E1 is uniform elongation measured by a tensile test in accordance with JIS Z 2241.

Solution to Problem

The inventors conducted extensive studies to solve the technical problem outlined above. As a result, the inventors made the following discoveries.

It is important to appropriately adjust a chemical composition of a base steel sheet of a galvanized steel sheet and steel microstructure of the base steel sheet of the galvanized steel sheet such that:

area fraction of ferrite: 20.0% or more and 90.0% or less, area fraction of bainitic ferrite: 4.0% or more and 60.0% or less, area fraction of tempered martensite: 20.0% or less, including 0%, area fraction of retained austenite: 3.0% or more, area fraction of fresh martensite: 20.0% or less, including 0%, $S_F+S_{BF}$: 55.0% or more and 95.0% or less, $S_{MA1}$: 4.0% or more, and $S_{MA2}$: 1.5% or more.

This results in a galvanized steel sheet having high strength, excellent ductility, excellent strain hardenability in the low strain range, and excellent strain hardenability in the high strain range.

Here, $S_F$ is area fraction of ferrite, $S_{BF}$ is area fraction of bainitic ferrite, $S_{MA1}$ is area fraction of the sum of island regions of hard secondary phase consisting of retained austenite and fresh martensite having a circularity of 0.40 or less, and $S_{MA2}$ is area fraction of the sum of island regions of the hard secondary phase having a circularity of 0.20 or less and an aspect ratio of 4.0 or less.

The present disclosure is based on these discoveries and further studies.

Primary features of the present disclosure are as follows.

1. A galvanized steel sheet comprising a base steel sheet and a galvanized layer on a surface of the base steel sheet, wherein the base steel sheet comprises:
   - a chemical composition containing (consisting of), in mass %,
     - C: 0.040% or more and 0.200% or less,
     - Si: 0.20% or more and 3.00% or less,
     - Mn: 1.00% or more and less than 3.50%,
     - P: 0.001% or more and 0.100% or less,
     - S: 0.0200% or less,
     - Al: 0.005% or more and 2.000% or less, and
     - N: 0.0100% or less,
   - with the balance being Fe and inevitable impurity,
   - the steel microstructure of the base steel sheet comprises:
   - area fraction of ferrite: 20.0% or more and 90.0% or less,
   - area fraction of bainitic ferrite: 4.0% or more and 60.0% or less,
   - area fraction of tempered martensite: 20.0% or less, including 0%,
   - area fraction of retained austenite: 3.0% or more,
   - area fraction of fresh martensite: 20.0% or less, including 0%,
   - $S_F+S_{BF}$: 55.0% or more and 95.0% or less,
   - $S_{MA1}$: 4.0% or more, and
   - $S_{MA2}$: 1.5% or more, wherein
   - tensile strength is 590 MPa or more,
   - where
   - $S_F$ is area fraction of ferrite,
   - $S_{BF}$ is area fraction of bainitic ferrite,
   - $S_{MA1}$ is area fraction of the sum of island regions of hard secondary phase consisting of retained austenite and fresh martensite having a circularity of 0.40 or less, and
   - $S_{MA2}$ is area fraction of the sum of island regions of the hard secondary phase having a circularity of 0.20 or less and an aspect ratio of 4.0 or less.
2. The galvanized steel sheet according to 1, above, wherein the chemical composition of the base steel sheet further contains, in mass %, at least one selected from the group consisting of:

Ti: 0.200% or less,
Nb: 0.200% or less,
V: 0.100% or less,
B: 0.0100% or less,
Cu: 1.000% or less,
Cr: 1.000% or less,
Ni: 1.000% or less,
Mo: 0.500% or less,
Sb: 0.200% or less,
Sn: 0.200% or less,
Ta: 0.100% or less,
W: 0.500% or less,
Mg: 0.0200% or less,
Zn: 0.0200% or less,
Co: 0.0200% or less,
Zr: 0.0200% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM: 0.0200% or less.

3. The galvanized steel sheet according to 1 or 2, above, wherein $S_{\gamma 2}/S_{\gamma 1}$ is 0.10 or more in the steel microstructure of the base steel sheet,
where
$S_{\gamma 1}$ is area fraction of retained austenite having a solute C concentration of 0.70% or more, and
$S_{\gamma 2}$ is area fraction of retained austenite having a solute C concentration of 0.85% or more.
4. The galvanized steel sheet according to any one of 1 to 3, above, wherein diffusible hydrogen content of the base steel sheet is 0.50 mass ppm or less.
5. The galvanized steel sheet according to any one 1 to 4, above, wherein the galvanized layer is a hot-dip galvanized layer or a galvannealed layer.
6. A member made using the galvanized steel sheet according to any one of 1 to 5, above.
7. A method for manufacturing a galvanized steel sheet, the method comprising:
hot rolling a steel slab having the chemical composition according to 1 or 2, above, to produce a hot-rolled steel sheet;
cold rolling the hot-rolled steel sheet to produce a cold-rolled steel sheet;
annealing the cold-rolled steel sheet at an annealing temperature of 760° C. or more and 900° C. or less for an annealing time of 20 s or more;
cooling the cold-rolled steel sheet to a first cooling stop temperature of 350° C. or more and 550° C. or less;
holding the cold-rolled steel sheet at a temperature range of 350° C. or more and 550° C. or less for 3 s or more to 600 s or less;
coating the cold-rolled steel sheet by a galvanizing treatment to produce a galvanized steel sheet;
cooling the galvanized steel sheet to a second cooling stop temperature of 280° C. or more and 470° C. or less; and
holding the galvanized steel sheet at a temperature range of 280° C. or more and 470° C. or less for 10 s or more to 2000 s or less,
wherein
the first cooling stop temperature, temperature of a galvanizing bath in the galvanizing treatment, and the second cooling stop temperature satisfy the following Expression (1) and Expression (2)

$$-120° \text{ C.} \le T_0 - T_1 \le 80° \text{ C.} \quad (1)$$

$$0° \text{ C.} \le T_0 - T_2 \quad (2)$$

where
$T_0$ is the first cooling stop temperature in ° C.,
$T_1$ is the temperature of the galvanizing bath in the galvanizing treatment in ° C., and
$T_2$ is the second cooling stop temperature in ° C.
8. The method of producing a galvanized steel sheet according to 7, above, wherein the galvanizing treatment is a hot-dip galvanizing treatment or a galvannealing treatment.
9. A method of producing a member, wherein the galvanized steel sheet according to any one of 1 to 5, above, is subjected to at least one of a forming process or a joining process to produce the member.

Advantageous Effect

According to the present disclosure, a galvanized steel sheet having high strength, excellent ductility, excellent strain hardenability in the low strain range, and excellent strain hardenability in the high strain range is obtainable. Further, the galvanized steel sheet has high strength, excellent ductility, and excellent strain hardenability over a wide range of strain, making it extremely advantageous for use as a material for automobile members and the like that have complex shapes. A steel sheet that has excellent ductility and excellent strain hardenability over a wide range of strain also has excellent anti-crash property properties, and therefore the galvanized steel sheet according to the present disclosure may be very advantageously applied as a material for an impact energy absorbing member or the like of an automobile.

DETAILED DESCRIPTION

Figures 1A, 1B:
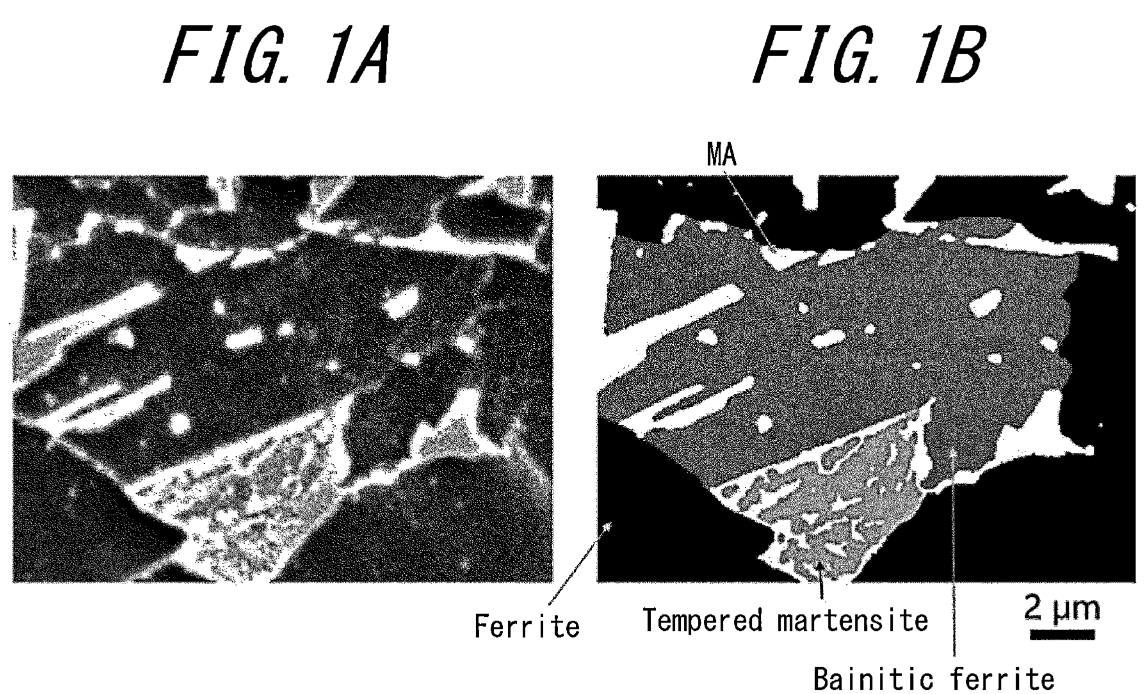
FIG. 1A is an example of a microstructure image from a scanning electron microscope (SEM) used for microstructure identification.
FIG. 1B is the microstructure image of FIG. 1A color-coded by phase using Adobe Photoshop by Adobe Systems Inc.

The following describes embodiments of the present disclosure.

[1] Galvanized Steel Sheet

First, a chemical composition of a base steel sheet of a galvanized steel sheet according to an embodiment of the present disclosure is described. Hereinafter, although the unit in all chemical compositions is "mass %", this may be indicated simply as "%", unless otherwise specified.

C: 0.040% or more and 0.200% or less C is an element effective for securing TS of 590 MPa or more, high ductility, and strain hardenability by forming appropriate amounts of fresh martensite, bainitic ferrite, and retained austenite. Here, when C content is less than 0.040%, an area fraction of ferrite increases, and achieving a TS of 590 MPa or more becomes difficult. Further, reduced ductility and strain hardenability may result. On the other hand, when the C content exceeds 0.200%, retained austenite and fresh martensite increase excessively. As a result, voids are more likely to form during deformation, and ductility and strain hardenability in the high strain range are reduced.

The C content is therefore 0.040% or more and 0.200% or less. The C content is preferably 0.060% or more. The C content is more preferably 0.070% or more. Further, the C content is preferably 0.170% or less. The C content is more preferably 0.150% or less.

Si: 0.20% or more and 3.00% or less Si inhibits carbide formation and promotes formation of retained austenite. That is, Si is an element that affects the area fraction of retained austenite, $S_{MA1}$, $S_{MA2}$, and C concentration in the retained austenite. Here, Si content less than 0.20% reduces the area fraction of retained austenite, $S_{MA1}$, and $S_{MA2}$, and reduces ductility, strain hardenability in the low strain range, and strain hardenability in the high strain range. Further, a decrease in $S_{\gamma2}/S_{\gamma1}$ may result. On the other hand, when the Si content exceeds 3.00%, the area fraction of ferrite increases excessively and achieving a TS of 590 MPa or more becomes difficult. Further, C concentration in retained austenite increases excessively. As a result, voids are more likely to form during deformation, and ductility and strain hardenability in the high strain range are reduced.

The Si content is therefore 0.20% or more and 3.00% or less. The Si content is preferably 0.40% or more. The Si content is more preferably 0.50% or more. Further, the Si content is preferably 2.00% or less. The Si content is more preferably 1.90% or less.

Mn: 1.00% or more and less than 3.50%

Mn is an element that adjusts area fractions of ferrite, bainitic ferrite, and the like. Here, when Mn content is less than 1.00%, the area fraction of ferrite increases excessively, and achieving a TS of 590 MPa or more becomes difficult. On the other hand, when the Mn content is 3.50% or more, the area fractions of ferrite and bainitic ferrite decrease. Further, the area fraction of fresh martensite increases. As a result, the desired ductility and strain hardenability in the low strain range become unobtainable.

The Mn content is therefore 1.00% or more and less than 3.50%. The Mn content is preferably 1.10% or more. The Mn content is more preferably 1.40% or more. Further, the Mn content is preferably less than 2.80%. The Mn content is more preferably 2.50% or less.

P: 0.001% or more and 0.100% or less

P is an element that acts as a solid solution strengthener and increases steel sheet strength. To achieve this effect, P content is 0.001% or more. On the other hand, when the P content exceeds 0.100%, P segregates to prior austenite grain boundaries and embrittles the grain boundaries. As a result, voids are more likely to form during deformation, and ductility and strain hardenability in the high strain range are reduced.

The P content is therefore 0.001% or more and 0.100% or less. The P content is preferably 0.030% or less.

S: 0.0200% or less

S is present in steel as sulfide. In particular, when S content exceeds 0.0200%, voids are more likely to form during deformation, and ductility and strain hardenability in the high strain range are reduced.

The S content is therefore 0.0200% or less. The S content is preferably 0.0080% or less. A lower limit of the S content is not particularly specified.

In view of production technology constraints, the S content is preferably 0.0001% or more.

Al: 0.005% or more and 2.000% or less

Al inhibits carbide formation and promotes formation of retained austenite. That is, Al is an element that affects the area fraction of retained austenite, $S_{MA1}$, $S_{MA2}$, and $S_{\gamma2}/S_{\gamma1}$. To obtain these effects, Al content is 0.005% or more. On the other hand, when the Al content exceeds 2.000%, the area fraction of ferrite increases excessively, and achieving a TS of 590 MPa or more becomes difficult.

The Al content is therefore 0.005% or more and 2.000% or less. The Al content is preferably 0.010% or more. The Al content is more preferably 0.015% or more. The Al content is even more preferably 0.020% or more. Further, the Al content is preferably 1.000% or less. The Al content is more preferably 0.900% or less.

N: 0.0100% or less N is present in steel as nitride. In particular, when N content exceeds 0.0100%, steel sheet ultimate deformability is reduced. As a result, voids are more likely to form during deformation, and ductility and strain hardenability in the high strain range are reduced.

The N content is therefore 0.0100% or less. Further, the N content is preferably 0.0050% or less. A lower limit of the N content is not particularly specified. In view of production technology constraints, the N content is preferably 0.0005% or more.

Basic composition of the base steel sheet of the galvanized steel sheet according to an embodiment of the present disclosure is described above. The base steel sheet of the galvanized steel sheet according to an embodiment of the present disclosure has a chemical composition containing the basic composition above, with the balance being Fe (iron) and inevitable impurity. Here, the base steel sheet of the galvanized steel sheet according to an embodiment of the present disclosure preferably has a chemical composition containing the basic composition above, with the balance being Fe and inevitable impurity. In addition to the above basic composition, the base steel sheet of the galvanized steel sheet according to an embodiment of the present disclosure may contain at least one of the components selected from the group listed below. The components listed below do not have a particular lower limit because the effect of the present disclosure is obtainable whenever content is equal to or less than the upper limit indicated below. When any of the following optional components are contained at less than a preferred lower limit described below, such a component is included as an inevitable impurity.

Ti: 0.200% or less,
Nb: 0.200% or less,
V: 0.100% or less,
B: 0.0100% or less,
Cu: 1.000% or less,
Cr: 1.000% or less,
Ni: 1.000% or less,
Mo: 0.500% or less,
Sb: 0.200% or less,
Sn: 0.200% or less, Ta: 0.100% or less,
W: 0.500% or less,
Mg: 0.0200% or less,
Zn: 0.0200% or less,
Co: 0.0200% or less,
Zr: 0.0200% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM: 0.0200% or less.

Ti: 0.200% or less

Ti causes TS to increase due to formation of fine carbides, nitrides, and carbonitrides during hot rolling and annealing. To obtain this effect, Ti content is preferably 0.001% or more. The Ti content is more preferably 0.005% or more. On the other hand, when the Ti content exceeds 0.200%, a large amount of coarse precipitates and inclusions may be formed. In such a case, when diffusible hydrogen is present in the steel sheet, coarse precipitates and inclusions as initiation points are likely to form voids during deformation, and ductility and strain hardenability in the high strain range are reduced. Therefore, when Ti is included, the Ti content is preferably 0.200% or less. The Ti content is more preferably 0.060% or less.

Nb: 0.200% or less

Nb, like Ti, causes TS to increase due to formation of fine carbides, nitrides, and carbonitrides during hot rolling and annealing. To obtain this effect, Nb content is preferably 0.001% or more. The Nb content is more preferably 0.005% or more. On the other hand, when the Nb content exceeds 0.200%, a large amount of coarse precipitates and inclusions may be formed. As a result, voids are more likely to form during deformation, and ductility and strain hardenability in the high strain range are reduced. Therefore, when Nb is included, the Nb content is preferably 0.200% or less. The Nb content is more preferably 0.060% or less.

V: 0.100% or less

V, like Ti and Nb, causes TS to increase due to formation of fine carbides, nitrides, and carbonitrides during hot rolling and annealing. To obtain this effect, V content is preferably 0.001% or more. The V content is more preferably 0.005% or more. On the other hand, when the V content exceeds 0.100%, a large amount of coarse precipitates and inclusions may be formed. As a result, voids are more likely to form during deformation, and ductility and strain hardenability in the high strain range are reduced. Therefore, when V is included, the V content is preferably 0.100% or less. The V content is more preferably 0.060% or less.

B: 0.0100% or less

B is an element that increases hardenability by segregating at austenite grain boundaries. Further, B is an element that inhibits ferrite formation and grain growth during cooling after annealing. To obtain these effects, B content is preferably 0.0001% or more. The B content is more preferably 0.0002% or more. On the other hand, when the B content exceeds 0.0100%, cracking may occur inside the steel sheet during hot rolling, which may reduce ductility and strain hardenability in the high strain range of a steel sheet. Therefore, when B is included, the B content is preferably 0.0100% or less. The B content is more preferably 0.0050% or less.

Cu: 1.000% or less

Cu is an element that increases hardenability. In particular, Cu is an element that is effective for adjusting the area fraction of hard fresh martensite and the like to a more preferred range, and thereby adjusting TS to a more preferred range. To obtain this effect, Cu content is preferably 0.005% or more. The Cu content is more preferably 0.020% or more. On the other hand, when the Cu content exceeds 1.000%, the area fraction of fresh martensite increases excessively and TS becomes excessively high. Further, a large amount of coarse precipitates and inclusions may be formed. In such cases, when diffusible hydrogen is present in the steel sheet, coarse precipitates and inclusions may become initiation points for cracks during tensile testing. That is, a decrease in ductility and strain hardenability in the high strain range may be caused. Therefore, when Cu is included, the Cu content is preferably 1.000% or less. The Cu content is more preferably 0.200% or less.

Cr: 1.000% or less

Cr is an element that increases hardenability, and Cr is an element effective for formation of retained austenite and fresh martensite. To obtain these effects, Cr content is preferably 0.0005% or more. In particular, from a viewpoint of achieving a more preferred range of TS, the Cr content is more preferably 0.010% or more. On the other hand, when the Cr content exceeds 1.000%, the area fraction of hard fresh martensite may increase excessively, leading to a decrease in ductility and strain hardenability in the high strain range. Therefore, when Cr is included, the Cr content is preferably 1.000% or less. Further, the Cr content is more preferably 0.250% or less. The Cr content is even more preferably 0.100% or less.

Ni: 1.000% or less

Ni is an element that increases hardenability. Further, Ni is an element that is effective for adjusting the area fraction of retained austenite and fresh martensite to a more preferred range, and thereby adjusting TS to a more preferred range. To obtain this effect, Ni content is preferably 0.005% or more. The Ni content is more preferably 0.020% or more. On the other hand, when the Ni content exceeds 1.000%, the area fraction of fresh martensite may increase excessively, leading to a decrease in ductility and strain hardenability in the high strain range. Further, a large amount of coarse precipitates and inclusions may be formed. In such cases, when diffusible hydrogen is present in the steel sheet, the coarse precipitates and inclusions may become initiation points of cracks when the steel sheet is worked, that is, ductility and strain hardenability in the high strain range may decrease. Therefore, when Ni is included, the Ni content is preferably 1.000% or less. The Ni content is more preferably 0.800% or less.

Mo: 0.500% or less

Mo is an element that increases hardenability. Further, Mo is an effective element for forming retained austenite. To obtain these effects, Mo content is preferably 0.005% or more. The Mo content is more preferably 0.010% or more. The Mo content is even more preferably 0.030% or more. On the other hand, when the Mo content exceeds 0.500%, the area fraction of fresh martensite may increase excessively, leading to a decrease in ductility and strain hardenability in the high strain range. Therefore, when Mo is included, the Mo content is preferably 0.500% or less. The Mo content is more preferably 0.450% or less. The Mo content is even more preferably 0.400% or less.

Sb: 0.200% or less

Sb is an element effective for inhibiting diffusion of C in the vicinity of the steel sheet surface during annealing and for controlling the formation of a soft layer in the vicinity of the steel sheet surface. To obtain these effects, Sb content is preferably 0.002% or more. The Sb content is more preferably 0.005% or more. On the other hand, when the Sb content exceeds 0.200%, a soft layer is not formed in the vicinity of the steel sheet surface, which may lead to a decrease in ductility. Therefore, when Sb is included, the Sb content is preferably 0.200% or less. The Sb content is more preferably 0.020% or less.

Sn: 0.200% or less

Sn, like Sb, is an element effective for inhibiting the diffusion of C in the vicinity of the steel sheet surface during annealing and for controlling the formation of a soft layer in the vicinity of the steel sheet surface. To obtain these effects, Sn content is preferably 0.002% or more. The Sn content is more preferably 0.005% or more. On the other hand, when the Sn content exceeds 0.200%, a soft layer is not formed in the vicinity of the steel sheet surface, which may lead to a decrease in ductility. Therefore, when Sn is included, the Sn content is preferably 0.200% or less. The Sn content is more preferably 0.020% or less.

Ta: 0.100% or less

Ta, like Ti, Nb, and V, causes TS to increase due to formation of fine carbides, nitrides, and carbonitrides during hot rolling and annealing. Further, Ta is partially solid-soluble in Nb carbides and Nb carbonitrides to form composite precipitates such as (Nb, Ta) (C, N). This inhibits coarsening of precipitates and stabilizes strengthening by precipitation, resulting in improved TS. To obtain these effects, Ta content is preferably 0.001% or more. On the other hand, when the Ta content exceeds 0.100%, a large amount of coarse precipitates and inclusions may be formed. In such cases, when diffusible hydrogen is present in the steel sheet, coarse precipitates and inclusions may become initiation points for cracks when the steel sheet is worked. That is, a decrease in ductility and strain hardenability in the high strain range may be caused. Therefore, when Ta is included, the Ta content is preferably 0.100% or less.

W: 0.500% or less

W is an element effective for increasing hardenability and adjusting TS to a more preferred range. To obtain these effects, W content is preferably 0.001% or more. The W content is more preferably 0.030% or more. On the other hand, when the W content exceeds 0.500%, the area fraction of hard fresh martensite may increase excessively, leading to a decrease in ductility and strain hardenability in the high strain range. Therefore, when W is included, the W content is preferably 0.500% or less. The W content is more preferably 0.450% or less. The W content is even more preferably 0.400% or less.

Mg: 0.0200% or less

Mg is an effective element for spheroidizing the shape of inclusions such as sulfides and oxides to improve ductility and strain hardenability in the high strain range. To obtain these effects, Mg content is preferably 0.0001% or more. On the other hand, when the Mg content exceeds 0.0200%, a large amount of coarse precipitates and inclusions may be formed. In such cases, when diffusible hydrogen is present in the steel sheet, coarse precipitates and inclusions may become initiation points for cracks when the steel sheet is worked. That is, a decrease in ductility and strain hardenability in the high strain range may be caused. Therefore, when Mg is included, the Mg content is preferably 0.0200% or less.

Zn: 0.0200% or less

Zn is an effective element for spheroidizing the shape of inclusions to improve ductility and strain hardenability in the high strain range. To obtain this effect, Zn content is preferably 0.0010% or more. On the other hand, when the Zn content exceeds 0.0200%, a large amount of coarse precipitates and inclusions may be formed. In such cases, when diffusible hydrogen is present in the steel sheet, coarse precipitates and inclusions may become initiation points for cracks when the steel sheet is worked. That is, a decrease in ductility and strain hardenability in the high strain range may be caused. Therefore, when Zn is included, the Zn content is preferably 0.0200% or less.

Co: 0.0200% or less

Co, like Zn, is an effective element for spheroidizing the shape of inclusions to improve ductility and strain hardenability in the high strain range. To obtain this effect, Co content is preferably 0.0010% or more. On the other hand, when the Co content exceeds 0.0200%, a large amount of coarse precipitates and inclusions may be formed. In such cases, when diffusible hydrogen is present in the steel sheet, coarse precipitates and inclusions may become initiation points for cracks when the steel sheet is worked. That is, a decrease in ductility and strain hardenability in the high strain range may be caused. Therefore, when Co is included, the Co content is preferably 0.0200% or less.

Zr: 0.0200% or less

Zr, like Zn and Co, is an effective element for spheroidizing the shape of inclusions to improve ductility and strain hardenability in the high strain range. To obtain this effect, Zr content is preferably 0.0010% or more. On the other hand, when the Zr content exceeds 0.0200%, a large amount of coarse precipitates and inclusions may be formed. In such cases, when diffusible hydrogen is present in the steel sheet, coarse precipitates and inclusions may become initiation points for cracks when the steel sheet is worked. That is, a decrease in ductility and strain hardenability in the high strain range may be caused. Therefore, when Zr is included, the Zr content is preferably 0.0200% or less.

Ca: 0.0200% or less

Ca is present in steel as inclusions. Here, when Ca content exceeds 0.0200%, a large amount of coarse inclusions may be formed. In such cases, when diffusible hydrogen is present in the steel sheet, coarse inclusions may become initiation points for cracks when the steel sheet is worked. That is, a decrease in ductility and strain hardenability in the high strain range may be caused. Therefore, when Ca is included, the Ca content is preferably 0.0200% or less. The Ca content is more preferably 0.0020% or less. A lower limit of Ca content is not particularly limited. The Ca content is preferably 0.0005% or more. Further, in view of production technology constraints, the Ca content is more preferably 0.0010% or more.

Ce: 0.0200% or less, Se: 0.0200% or less, Te: 0.0200% or less, Ge: 0.0200% or less, As: 0.0200% or less, Sr: 0.0200% or less, Cs: 0.0200% or less, Hf: 0.0200% or less, Pb: 0.0200% or less, Bi: 0.0200% or less, and REM: 0.0200% or less Ce, Se, Te, Ge, As, Sr, Cs, Hf, Pb, Bi, and REM are all effective elements for improving ductility and strain hardenability in the high strain range. To achieve these effects, content of each of Ce, Se, Te, Ge, As, Sr, Cs, Hf, Pb, Bi, and REM is preferably 0.0001% or more. On the other hand, when the content of any one of Ce, Se, Te, Ge, As, Sr, Cs, Hf, Pb, Bi, or REM exceeds 0.0200%, a large amount of coarse precipitates and inclusions may form. In such cases, when diffusible hydrogen is present in the steel sheet, coarse precipitates and inclusions may become initiation points for cracks when the steel sheet is worked. That is, a decrease in ductility and strain hardenability in the high strain range may be caused. Therefore, when at least one of Ce, Se, Te, Ge, As, Sr, Cs, Hf, Pb, Bi, or REM is included, the content thereof is preferably 0.0200% or less.

Elements other than those described above are Fe and inevitable impurity.

That is, the base steel sheet of the galvanized steel sheet according to an embodiment of the present disclosure comprises:

a chemical composition containing, in mass %,
C: 0.040% or more and 0.400% or less,
Si: 0.20% or more and 3.00% or less,
Mn: 1.00% or more and less than 3.50%,
P: 0.001% or more and 0.100% or less,
S: 0.0200% or less,
Al: 0.010% or more and 2.000% or less, and
N: 0.0100% or less,
and optionally at least one selected from the group consisting of
Ti: 0.200% or less,
Nb: 0.200% or less,
V: 0.100% or less,
B: 0.0100% or less,
Cu: 1.000% or less,
Cr: 1.000% or less,
Ni: 1.000% or less,
Mo: 0.500% or less,
Sb: 0.200% or less,
Sn: 0.200% or less,
Ta: 0.100% or less,
W: 0.500% or less,
Mg: 0.0200% or less,
Zn: 0.0200% or less,
Co: 0.0200% or less,
Zr: 0.0200% or less,
Ca: 0.0200% or less,
Ce: 0.0200% or less,
Se: 0.0200% or less,
Te: 0.0200% or less,
Ge: 0.0200% or less,
As: 0.0200% or less,
Sr: 0.0200% or less,
Cs: 0.0200% or less,
Hf: 0.0200% or less,
Pb: 0.0200% or less,
Bi: 0.0200% or less, and
REM: 0.0200% or less.
with the balance being Fe and inevitable impurity.

Steel microstructure of the base steel sheet of the galvanized steel sheet according to an embodiment of the present disclosure is described below.

The steel microstructure of the base steel sheet of the galvanized steel sheet according to an embodiment of the present disclosure comprises: area fraction of ferrite: 20.0% or more and 90.0% or less, area fraction of bainitic ferrite: 4.0% or more and 60.0% or less, area fraction of tempered martensite: 20.0% or less, including 0%, area fraction of retained austenite: 3.0% or more, area fraction of fresh martensite: 20.0% or less, including 0%, $S_F+S_{BF}$: 55.0% or more and 95.0% or less,
$S_{MA1}$: 4.0% or more, and
$S_{MA2}$: 1.5% or more.
Here,
$S_F$ is area fraction of ferrite,
$S_{BF}$ is area fraction of bainitic ferrite,
$S_{MA1}$ is area fraction of the sum of island regions of hard secondary phase consisting of retained austenite and fresh martensite having a circularity of 0.40 or less, and
$S_{MA2}$ is area fraction of the sum of island regions of the hard secondary phase having a circularity of 0.20 or less and an aspect ratio of 4.0 or less.

The reasons for each of these limitations are described below.

Area fraction of ferrite: 20.0% or more and 90.0% or less

Soft ferrite is a phase that improves ductility and strain hardenability in the low strain range. From the viewpoint of securing high ductility and excellent strain hardenability in the low strain range, the area fraction of ferrite is 20.0% or more. The area fraction of ferrite is preferably 25.0% or more. The area fraction of ferrite is more preferably 40.0% or more. Further, from the viewpoint of securing a TS of 590 MPa or more, the area fraction of ferrite is 90.0% or less. The area fraction of ferrite is preferably 85.0% or less. The area fraction of ferrite is more preferably 80.0% or less. Area fraction of bainitic ferrite: 4.0% or more and 60.0% or less Bainitic ferrite is a phase formed after ferrite is formed and C, Mn, and the like are enriched in untransformed austenite. Further, bainitic ferrite is a useful phase for securing an appropriate amount of retained austenite and obtaining high $S_{\gamma 2}/S_{\gamma l}$ by utilizing further C diffusion from bainitic ferrite to untransformed austenite. In addition, bainitic ferrite is a phase that breaks up and refines untransformed austenite, reduces circularity of untransformed austenite, and causes untransformed austenite to take a shape that facilitates C enrichment. That is, bainitic ferrite, as a phase that causes untransformed austenite to take a shape that facilitates C enrichment, is also an important phase to obtain the desired $S_{MA1}$ and $S_{MA2}$, as well as high $S_{\gamma 2}/S_{\gamma 1}$. The area fraction of bainitic ferrite is therefore 4.0% or more. Further, the area fraction of bainitic ferrite is preferably 8.0% or more. The area fraction of bainitic ferrite is more preferably 10.0% or more. On the other hand, an excessive increase in the area fraction of bainitic ferrite instead decreases ductility. The area fraction of bainitic ferrite is therefore 60.0% or less. Further, the area fraction of bainitic ferrite is preferably 40.0% or less.

Bainitic ferrite refers only to the phase of bainite that has a crystal structure equivalent to ferrite, and may have a form that encapsulates iron-based carbides, retained austenite, and the like. However, iron-based carbides and retained austenite encapsulated in bainitic ferrite are not counted as bainitic ferrite area. Bainite here includes both upper bainite and lower bainite.

Area fraction of tempered martensite: 20.0% or less (including 0%) Tempered martensite has an intermediate hardness between soft ferrite and hard fresh martensite and the like, and is a phase for securing high strength. However, from the viewpoint of securing good ductility, the area fraction of tempered martensite is 20.0% or less. A lower limit of the area fraction of tempered martensite is not particularly limited, and may be 0%. The area fraction of tempered martensite, when 980 K TS, is preferably 3.0% or more and 15.0% or less. Further, the area fraction of tempered martensite, when 590 MPa≤TS<980 MPa, is preferably 5.0% or less. The area fraction of tempered martensite, when 590 MPa≤TS<980 MPa, is more preferably 0%.

Tempered martensite is martensite that has undergone tempering and includes self-tempered martensite.

Area fraction of retained austenite: 3.0% or more

From the viewpoint of obtaining excellent ductility, excellent strain hardenability in the low strain range, and excellent strain hardenability in the high strain range, the area fraction of retained austenite is 3.0% or more. The area fraction of retained austenite is preferably 3.5% or more. The area fraction of retained austenite is more preferably 4.0% or more. The area fraction of retained austenite is even more preferably 4.5% or more. An upper limit of the area fraction of retained austenite is not particularly limited. The area fraction of retained austenite is preferably 20.0% or less.

Area fraction of fresh martensite: 20.0% or less (including 0%)

From the viewpoint of ensuring excellent ductility and excellent strain hardenability in the high strain range, the area fraction of fresh martensite is 20.0% or less. A lower limit of the area fraction of fresh martensite is not particularly limited, and may be 0%. Further, the area fraction of fresh martensite is preferably 1.0% or more.

Fresh martensite is martensite as quenched (not tempered).

The area fraction of residual microstructure other than described above is preferably 10.0% or less. The area fraction of the residual microstructure is more preferably 5.0% or less. Further, the area fraction of the residual microstructure may be 0%.

The residual microstructure is not particularly limited, and may include carbides such as pearlite, cementite encapsulated in bainite, and the like. The type of residual microstructure may be confirmed, for example, by observation with a scanning electron microscope (SEM).

Here, the area fractions of ferrite, bainitic ferrite, tempered martensite, retained austenite, and fresh martensite are measured at a ¼ sheet thickness position of the base steel sheet, as follows.

A sample is cut from the base steel sheet such that a thickness cross-section parallel to the rolling direction of the base steel sheet becomes an observation plane. The observation plane of the sample is then mirror-polished using diamond paste. The observation plane of the sample is then polished using colloidal silica and etched with 3 vol % nital to reveal the microstructure.

Then, five views of a 25.6 μm×17.6 μm field of view of the observation plane of the sample are observed using a scanning electron microscope (SEM) at an accelerating voltage of 15 kV and 5,000× magnification.

From an obtained microstructure image (see, for example, FIG. 1A), ferrite, bainitic ferrite, tempered martensite, retained austenite, and fresh martensite are identified as follows.

Ferrite: a black region, blocky in morphology. Further, almost no iron-based carbides are encapsulated. However, when iron-based carbides are encapsulated, the area of ferrite does not include the area of the iron-based carbides. The same is also true for bainitic ferrite and tempered martensite, which are described below.

Bainitic ferrite: black to dark gray region, which may be blocky or irregular in morphology. Further, no or relatively few iron-based carbides are encapsulated.

Tempered martensite: gray region, irregular in morphology. Further, a relatively large number of iron-based carbides are encapsulated.

Hard secondary phase (retained austenite+fresh martensite): white to light gray region, irregular in morphology. Further, iron-based carbides are not encapsulated. When size is relatively large, the color gradually darkens farther away from an interface with other microstructure, and an interior may be dark gray.

Residual microstructure: pearlite, cementite, and other carbides mentioned above have morphology and the like as known in the art.

Next, the regions of the phases identified in the microstructure image are color-coded (converted to a 4-value image) using Adobe Photoshop by Adobe Systems Inc. (see, for example, FIG. 1), and the area of each phase is calculated. Then, values are calculated by dividing the area of each phase (the total area of each phase) by the area of the observation region (25.6 μm×17.6 μm), and multiplying by 100 for each of the five fields of view. For each phase (ferrite, bainitic ferrite, tempered martensite and hard secondary phase), the average of the values is then used as the area fraction. FIG. 1A is a partial image extracted from one field of view of an observation region (25.6 μm×17.6 μm) of a sample, as a reference for the above description.

Further, the area fraction of retained austenite is measured as follows.

The base steel sheet is machine ground in the thickness direction (depth direction) to a ¼ sheet thickness position, and then chemically polished with oxalic acid to prepare the observation plane. The observation plane is then observed by X-ray diffraction. CoKα radiation is used for incident X-rays to determine a ratio of diffraction intensity of the (200), (220), and (311) planes of fcc iron (austenite) to diffraction intensity of the (200), (211), and (220) planes of bcc iron. The volume fraction of retained austenite is then calculated from the ratio of the diffraction intensity of each plane. Then, assuming that the retained austenite is uniform in three dimensions, the volume fraction of the retained austenite is taken as the area fraction of retained austenite.

Further, the area fraction of fresh martensite is obtained by subtracting the area fraction of retained austenite from the area fraction of hard secondary phase obtained as described above.

[area fraction of fresh martensite (%)]=[area fraction of hard secondary phase (%)]−[area fraction of retained austenite (%)]

Further, the area fraction of residual microstructure is obtained by subtracting the area fraction of ferrite, the area fraction of bainitic ferrite, the area fraction of tempered martensite, and the area fraction of hard secondary phase as determined above from 100%.

[area fraction of residual microstructure (%)]=100−[area fraction of ferrite (%)]−[area fraction of bainitic ferrite (%)]−[area fraction of tempered martensite (%)]−[area fraction of hard secondary phase (%)]

$S_F+S_{BF}$: 55.0% or more and 95.0% or less

From the viewpoint of securing excellent ductility and excellent strain hardenability in the low strain range, $S_F+S_{BF}$ is 55.0% or more. $S_F+S_{BF}$ is preferably 60.0% or more. On the other hand, from the viewpoint of securing a TS of 590 MPa or more, $S_F+S_{BF}$ is 95.0% or less. $S_F+S_{BF}$ is preferably 93.0% or less.

Here, $S_F$ is area fraction of ferrite, and $S_{BF}$ is area fraction of bainitic ferrite.

$S_{MA1}$: 4.0% or more

The hard secondary phase consisting of retained austenite and fresh martensite (hereinafter also referred to as MA) includes multiple island regions. Among these island regions, an island region that has a circularity of 0.40 or less (hereafter also referred to as MA1) contains a large amount of retained austenite. Further, MA1 has a high concentration of solute C in retained austenite. Therefore, MA1 is important for securing excellent strain hardenability in the low strain range and excellent strain hardenability in the high strain range. Therefore, $S_{MA1}$, the area fraction of MA1, is 4.0% or more. $S_{MA1}$ is preferably 5.0% or more. An upper limit of $S_{MA1}$ is not particularly limited, but 30.0% or less is preferred.

$S_{MA2}$: 1.5% or more

Among the island regions of MA, an island region that has a circularity of 0.20 or less and an aspect ratio of 4.0 or less (hereinafter also referred to as MA2) contains a large amount of retained austenite. Further, in MA2, concentration of solute C in retained austenite is particularly high. Therefore, MA2 is important for securing excellent strain hardenability in the high strain range. Therefore, $S_{MA2}$, the area fraction of MA2, is 1.5% or more. $S_{MA2}$ is preferably 2.0% or more. An upper limit of $S_{MA2}$ is not particularly limited, but 20.0% or less is preferred.

Each island region is separated from other island regions of the hard secondary phase by a phase other than the hard secondary phase (each island region is in contact with a phase other than the hard secondary phase around an entire circumference of the island region). Further, specific shape of each island region is not particularly limited, and may be any of circular, elliptical, polygonal, ameboid (a shape extending in a plurality of irregular directions), and the like.

Further, MA1 also includes MA2. That is, MA2 is an island region of MA1 that has a circularity of 0.20 or less and an aspect ratio of 4.0 or less.

Here, $S_{MA1}$ and $S_{MA2}$ are measured as follows.

Figures 2A, 2B, 2C:
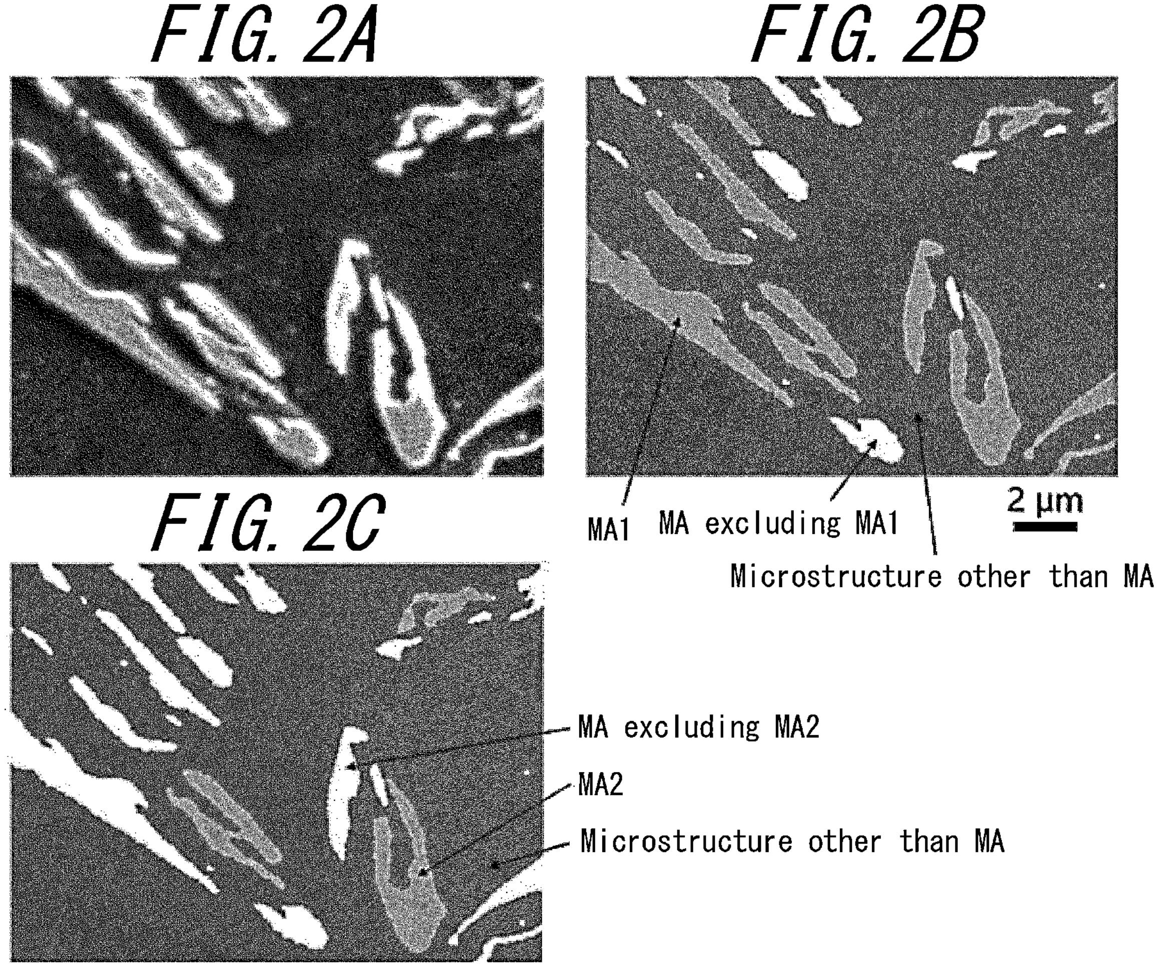
FIG. 2A is an example of a microstructure image from a SEM used for microstructure identification.
FIG. 2B is the microstructure image of FIG. 2A where among hard secondary phase (MA) island regions extracted, the island regions classified as MA1 and the island regions classified as other than MA1 are color-coded using Adobe Photoshop by Adobe Systems Inc.
FIG. 2C is the microstructure image of FIG. 2A where among hard secondary phase (MA) island regions extracted, the island regions classified as MA2 and the island regions classified as other than MA2 are color-coded using Adobe Photoshop by Adobe Systems Inc.

That is, the hard secondary phase (retained austenite+fresh martensite) and the residual microstructure other than the above are identified in a microstructure image (see, for example, FIG. 2A) as described above. Then, after color-coding (converting to a 5-value image) each phase using Adobe Photoshop by Adobe Systems Inc., the island regions of the hard secondary phase are extracted. Then, circularity and aspect ratio of each extracted island region are determined using ImageJ, which is open source software. The aspect ratio of each island region is determined by elliptically approximating each island region using a particle analysis function of ImageJ and dividing the major axis diameter W of the approximated ellipse by the minor axis diameter L (W/L). Then, based on the circularity of each island region, each island region is classified as MA1 or other, and the total area of island regions classified as MA1 is calculated. Further, based on the circularity and aspect ratio of each island region, each island region is classified as MA2 or other, and the total area of island regions classified as MA2 is calculated. FIG. 2B illustrates an example of the color-coded classification of each extracted island region of the hard secondary phase into MA1 and other. FIG. 2C illustrates an example of the color-coded classification of each extracted island region of the hard secondary phase into MA2 and other. Then, for each of MA1 and MA2, a total area for island regions classified as either MA1 or MA2 is divided by the area of the observation region (25.6 μm×17.6 μm), and multiplied by 100 (area fraction) for each of five fields of view. The average of the values (area fraction) for the five fields of view for each of MA1 and MA2 is then used as $S_{MA1}$ and $S_{MA2}$, respectively.

Further, FIGS. 2A, 2B, and 2C are each partial images extracted from one field of view of an observation region (25.6 μm×17.6 μm) of a sample, as a reference for the above explanation.

The circularity of an island region is a value calculated by the following expression.

$X=4\pi S/L^2$

Here,

X is circularity,

S is area of island region (μm$^2$), and

L is circumference of island region (μm).

$S_{\gamma2}/S_{\gamma1}$: 0.10 or more

Further, in the steel microstructure of the base steel sheet of the galvanized steel sheet according to an embodiment of the present disclosure, $S_{\gamma2}/S_{\gamma1}$ is preferably 0.10 or more. From the viewpoint of obtaining better strain hardenability in the high strain range, the distribution of solute C concentration in retained austenite preferably has a sufficiently long tail to the side of high C concentration. As a result of various investigations, the inventors found that $S_{\gamma2}/S_{\gamma1}$ is an effective index for comprehensively evaluating the tail length of the distribution of solute C concentration in retained austenite to the side of high C concentration. Here, when $S_{\gamma2}/S_{\gamma1}$ is 0.10 or more, particularly excellent strain hardenability in the high strain range is obtainable. Therefore, $S_{\gamma2}/S_{\gamma1}$ is preferably 0.10 or more. $S_{\gamma2}/S_{\gamma1}$ is more preferably 0.12 or more. $S_{\gamma2}/S_{\gamma1}$ is even more preferably 0.14 or more. An upper limit of $S_{\gamma2}/S_{\gamma1}$ is not particularly limited. However, when a certain amount of retained austenite with relatively low solute C concentration is not present, the effect of improving strain hardenability in the high strain range may be small. Therefore, $S_{\gamma2}/S_{\gamma1}$ is preferably 0.70 or less. $S_{\gamma2}/S_{\gamma1}$ is more preferably 0.60 or less.

Here, $S_{\gamma1}$ is area fraction of retained austenite having a solute C concentration of 0.70% or more, and $S_{\gamma2}$ is area fraction of retained austenite having a solute C concentration of 0.85% or more.

Further, $S_{\gamma2}/S_{\gamma1}$ is measured as follows.

In the same field of view as the aforementioned microstructure image (25.6 μm×17.6 μm), a two-dimensional distribution of C concentration in the base steel sheet is measured in five fields of view using a field emission electron probe microanalyzer (FE-EPMA). The measurement by FE-EPMA is performed after finish polishing, before etching. The FE-EPMA measurement may be performed with a wider field of view, and the same field of view region (25.6 μm×17.6 μm) may be extracted from the microstructure image in a later procedure. The quantitative precision of the two-dimensional distribution of C concentration is 0.020% or less, and the resolution is 0.10 μm or less. The step size is 0.05 μm, and the same step size is used in all five fields of view to perform point analysis of C concentration in a uniform grid pattern across the entire field of view. Then, the data for each measurement point of C concentration is integrated for the five fields of view. Then, from the data of the entire integrated measurement range, the number of measurement points where C concentration is 0.70% or more is determined. The number of measurement points where C concentration is 0.70% or more is then divided by the total number of measurement points in the entire integrated measurement range, and multiplied by 100 (area fraction) to determine $S_{\gamma1}$. In the same way, $S_{\gamma2}$ is determined from the number of measurement points where C concentration is 0.85% or more. However, upon determining from the same field of view of the microstructure image that other microstructures having high C concentration, such as carbides, pearlite, and the like (high C concentration microstructure), are present in addition to retained austenite and fresh martensite, then before integrating the data for each C concentration measurement point for five fields of view, the measurement point data in the area occupied by such a high C concentration microstructure is substituted with a negative value (for example, −1). This excludes the measurement point data in high C concentration microstructure from the number of measurement points having C concentrations of 0.70% or more and 0.85% or higher.

Ferrite, bainitic ferrite, tempered martensite, and fresh martensite have lower C concentrations than retained austenite. Therefore, the measurement point data in the above phases (ferrite, bainitic ferrite, tempered martensite and fresh martensite) are excluded from the number of measurement points where C concentration is actually 0.70% or more and 0.85% or more.

Further, in the base steel sheet of the galvanized steel sheet according to an embodiment of the present disclosure, diffusible hydrogen content is preferably 0.50 mass ppm or less.

Diffusible hydrogen content of base steel sheet: 0.50 mass ppm or less

From the viewpoint of obtaining better strain hardenability in the high strain range, diffusible hydrogen content of the base steel sheet is preferably 0.50 mass ppm or less. Further, the diffusible hydrogen content of the base steel sheet is more preferably 0.35 mass ppm or less. A lower limit of the diffusible hydrogen content of the base steel sheet is not particularly specified and may be 0 mass ppm. Further, in view of production technology constraints, the diffusible hydrogen content of the base steel sheet is preferably 0.01 mass ppm or more.

Here, the diffusible hydrogen content of the base steel sheet is measured as follows.

A test piece 30 mm long and 5 mm wide is taken from a galvanized steel sheet, and the galvanized layer is removed with alkali. Then, an amount of hydrogen released from the test piece is measured by a thermal desorption analysis method. Specifically, the test piece is continuously heated from room temperature to 300° C. at a heating rate of 200° C./h, and then cooled to room temperature. At this time, the amount of hydrogen released from the test piece in the temperature range from room temperature to 210° C. during the continuous heating is measured (cumulative hydrogen amount). The measured hydrogen amount is then divided by the mass of the test piece (after removal of the galvanized layer, before continuous heating), and a value converted to mass ppm units is the diffusible hydrogen content of the base steel sheet.

For a product (member) after forming or joining of galvanized steel sheets, a test piece is cut from the product under a typical operating environment and the diffusible hydrogen content of the base steel sheet portion is measured as described above. When the value is 0.50 mass ppm or less, the diffusible hydrogen content of the base steel sheet of the galvanized steel sheet at a material stage before the forming or joining may also be considered to be 0.50 mass ppm or less.

Mechanical properties of the galvanized steel sheet according to an embodiment of the present disclosure are described below.

Tensile strength (TS): 590 MPa or more

The tensile strength of the galvanized steel sheet according to an embodiment of the present disclosure is 590 MPa or more. The tensile strength of the galvanized steel sheet according to an embodiment of the present disclosure is preferably less than 1180 MPa.

The elongation after fracture (T-E1), strain hardening index in the low strain range ($n_1$), and strain hardening index in the high strain range ($n_2$) of the galvanized steel sheet according to an embodiment of the present disclosure are as described above.

Further, tensile strength (TS), elongation after fracture (T-E1), strain hardening index in the low strain range ($n_1$), and strain hardening index in the high strain range ($n_2$) are measured as described below in the EXAMPLES section.

Further, the galvanized layer of the galvanized steel sheet according to an embodiment of the present disclosure may be provided on only one surface of the base steel sheet, and may be provided on both surfaces.

The galvanized layer here refers to a coating layer in which Zn is the main component (Zn content of 50% or more), for example, a hot-dip galvanized layer or a galvannealed layer.

Here, for example, the hot-dip galvanized layer being composed of Zn, Fe: 20 mass % or less, and Al: 0.001 mass % or more and 1.0 mass % or less is preferred. Further, the hot-dip galvanized layer may optionally contain one or more elements selected from the group consisting of Pb, Sb, Si, Sn, Mg, Mn, Ni, Cr, Co, Ca, Cu, Li, Ti, Be, Bi, and REM, totaling 0 mass % or more and 3.5 mass % or less. Further, the Fe content of the hot-dip galvanized layer is more preferably less than 7 mass %. Other than the above elements, the balance is inevitable impurity.

Further, for example, the galvannealed layer being composed of Zn, Fe: 20 mass % or less, and Al: 0.001 mass % or more and 1.0 mass % or less is preferred. Further, the galvannealed layer may optionally contain one or more elements selected from the group consisting of Pb, Sb, Si, Sn, Mg, Mn, Ni, Cr, Co, Ca, Cu, Li, Ti, Be, Bi, and REM, totaling 0 mass % or more and 3.5 mass % or less. The Fe content of the galvannealed layer is more preferably 7 mass % or more. The Fe content of the galvannealed layer is even more preferably 8 mass % or more. Further, the Fe content of the galvannealed layer is more preferably 15 mass % or less. The Fe content of the galvannealed layer is even more preferably 12 mass % or less. Other than the above elements, the balance is inevitable impurity.

Further, coating weight per side of the galvanized layer is not particularly limited. The coating weight per side of the galvanized layer is preferably 20 g/m$^2$ to 80 g/m$^2$.

The coating weight of the galvanized layer is measured as follows.

A coating solution is prepared by adding 0.6 g of a corrosion inhibitor for Fe ("IBIT® 700BK" (IBIT is a registered trademark in Japan, other countries, or both) manufactured by Asahi Chemical Co., Ltd.) to 1 L of a 10 mass % hydrochloric acid aqueous solution. Then, the galvanized steel sheet to be the test piece is immersed in the coating solution to dissolve the galvanized layer. Mass loss of the test piece before and after dissolving is measured, and the value is divided by the surface area of the base steel sheet (surface area of a coated portion) to calculate the coating weight (g/m$^2$).

The thickness of the galvanized steel sheet according to an embodiment of the present disclosure is not particularly limited. The thickness of the galvanized steel sheet is preferably 0.3 mm or more. The thickness of the galvanized steel sheet is preferably 3.0 mm or less.

[2] Member

A member according to an embodiment of the present disclosure is described below.

The member according to an embodiment of the present disclosure is a member produced using the galvanized steel sheet described above as a material. For example, the material, the galvanized steel sheet, is subjected to at least one of forming or joining to produce the member.

Here, the galvanized steel sheet has a TS of 590 MPa or more and excellent formability. Therefore, the member according to an embodiment of the present disclosure is particularly suitable for application as a complex-shape member for use in the automobile field.

[3] Method of Producing Galvanized Steel Sheet

A method of producing a galvanized steel sheet according to an embodiment of the present disclosure is described below.

The method of producing a galvanized steel sheet according to an embodiment of the present disclosure comprises:

hot rolling a steel slab having the chemical composition described above to produce a hot-rolled steel sheet;

cold rolling the hot-rolled steel sheet to produce a cold-rolled steel sheet;

annealing the cold-rolled steel sheet at an annealing temperature of 760° C. or more and 900° C. or less for an annealing time of 20 s or more;

cooling the cold-rolled steel sheet to a first cooling stop temperature of 350° C. or more and 550° C. or less;

holding the cold-rolled steel sheet at a temperature range of 350° C. or more and 550° C. or less for 3 s or more to 600 s or less;

coating the cold-rolled steel sheet by a galvanizing treatment to produce a galvanized steel sheet;

cooling the galvanized steel sheet to a second cooling stop temperature of 280° C. or more and 470° C. or less; and holding the galvanized steel sheet at a temperature range of 280° C. or more and 470° C. or less for 10 s or more to 2000 s or less, wherein the first cooling stop temperature, temperature of a galvanizing bath in the galvanizing treatment, and the second cooling stop temperature satisfy the following Expression (1) and Expression (2).

$$-120^\circ \text{ C.} \leq T_0 - T_1 \leq 80^\circ \text{ C.} \quad (1)$$

$$0^\circ \text{ C.} \leq T_0 - T_2 \quad (2)$$

Here, $T_0$ is the first cooling stop temperature in ° C., $T_1$ is the temperature of the galvanizing bath in the galvanizing treatment in ° C., and $T_2$ is the second cooling stop temperature in ° C.

Unless otherwise specified, each temperature above refers to a surface temperature of the steel slab or the steel sheet.

First, a steel slab having the chemical composition described above is prepared. For example, steel material is melted to produce molten steel having the chemical composition described above. The steelmaking method is not particularly limited, and any known steelmaking method may be used, such as using a converter, electric furnace, and the like. Obtained molten steel is then solidified into a steel slab. The method of obtaining a steel slab from molten steel is not particularly limited. For example, continuous casting, ingot casting, and thin slab casting methods may be used. A continuous casting method is preferred from the viewpoint of hindering macro-segregation.

[Hot Rolling]

The steel slab is then hot rolled to produce a hot-rolled steel sheet.

An energy saving process may be applied to the hot rolling. Energy saving processes include hot charging (where a steel slab is charged into a heating furnace as a warm slab without cooling to room temperature and then hot rolled) and direct rolling (where a steel slab is hot rolled immediately after holding for a short period).

There are no particular limitations on hot rolling conditions. For example, hot rolling may be performed under the following conditions.

The steel slab is temporarily cooled to room temperature and then reheated before rolling. The slab heating temperature (reheating temperature) is preferably 1100° C. or more in view of carbide dissolution and reduced rolling load. The slab heating temperature is preferably 1300° C. or less, in order to prevent increased scale loss. The slab heating temperature is based on the temperature of the steel slab surface.

The steel slab is then subjected to rough rolling according to a conventional method to produce a rough-rolled sheet (hereinafter also referred to as a sheet bar). The sheet bar is then subjected to finish rolling to produce a hot-rolled steel sheet. When the slab heating temperature is low, heating the sheet bar using a bar heater or the like before finish rolling is preferable, from the viewpoint of preventing trouble during finish rolling. The rolling finish temperature is preferably the $Ar_3$ transformation temperature or more, in order to reduce rolling load. Further, the rolling finish temperature is preferably the $Ar_3$ transformation temperature or more because a high rolling reduction rate in an un-recrystallized state of austenite may result in the development of an abnormal microstructure elongated in the rolling direction, which may reduce the workability of the annealed sheet. The $Ar_3$ transformation temperature is determined by the following expression.

$$Ar_3(^\circ \text{ C.}) = 868 - 396 \times [C\%] + 25 \times [Si\%] - 68[Mn\%]$$

The [element symbol %] in the above expression represents the content (mass %) of the element in the chemical composition of the base steel sheet.

Sheet bars may be joined together during hot rolling, and finish rolling may be performed continuously. Further, the sheet bar may be temporarily coiled before finish rolling. Further, at least part of finish rolling may be conducted as lubrication rolling to reduce rolling load in the hot rolling.

Conducting lubrication rolling in such a manner is effective from the perspective of making the shape and material properties of the steel sheet uniform. In lubrication rolling, the frictional coefficient is preferably 0.10 or more. The frictional coefficient is preferably 0.25 or less.

In the hot rolling, which includes rough rolling and finish rolling, a steel slab is typically turned into a sheet bar by rough rolling and into a hot-rolled steel sheet by finish rolling. However, depending on mill capacity and other factors, there is no need to be concerned with such classification as long as the defined size is obtained.

The rolling finish temperature is preferably 800° C. or more. The rolling finish temperature is preferably 950° C. or less. The rolling finish temperature being 800° C. or more makes the steel microstructure at the hot-rolled steel sheet stage and, consequently, the steel microstructure of the final product more likely to be uniform. Uneven steel microstructure tends to reduce bendability. On the other hand, when the rolling finish temperature is more than 950° C., the amount of oxide (scale) formation increases. As a result, an interface between the steel substrate and oxide may be roughened, and the surface quality of the steel sheet after pickling and cold rolling may deteriorate. Further, coarse crystal grains may also cause a reduction in the strength and bendability of a steel sheet.

After finish rolling, the hot-rolled steel sheet is coiled. The coiling temperature is preferably 450° C. or more. The coiling temperature is preferably 750° C. or less.

[Pickling]

After the hot rolling, the hot-rolled steel sheet is optionally pickled. Pickling may remove oxides from the steel sheet surface, securing good chemical convertibility and coating or plating quality. Pickling may be performed in one or more batches. Pickling conditions are not particularly limited, and a conventional method may be followed.

[Cold Rolling]

The hot-rolled steel sheet is then subjected to cold rolling to produce a cold-rolled steel sheet. Cold rolling is performed by multi-pass rolling that requires two or more passes, for example, tandem-type multi-stand rolling, reverse rolling and the like.

The rolling reduction of the cold rolling is not particularly limited. The rolling reduction of the cold rolling is preferably 20% or more. The rolling reduction of the cold rolling is preferably 80% or less. When the rolling reduction of the cold rolling is less than 20%, coarsening and non-uniformity of the steel microstructure is more likely to occur during the annealing, which may result in reduced strength and workability in the final product. On the other hand, when the rolling reduction of the cold rolling exceeds 80%, the steel sheet may be prone to shape defects and the coating weight of the galvanized coating may become uneven.

Further, the cold-rolled steel sheet obtained after cold rolling may be subjected to pickling.

[Annealing]

The cold-rolled steel sheet obtained as described above is annealed at an annealing temperature of 760° C. or more and 900° C. or less, for an annealing time of 20 s or more. The number of annealing cycles may be two or more, but one is preferred from the viewpoint of energy efficiency.

Annealing temperature: 760° C. or more and 900° C. or less

When the annealing temperature is less than 760° C., the ratio of austenite formation during heating in the two-phase region of ferrite and austenite becomes insufficient, and the area fractions of bainitic ferrite and retained austenite are reduced. As a result, ductility, strain hardenability in the low strain range, and strain hardenability in the high strain range are reduced. Further, area fraction of ferrite and $S_F+S_{BF}$ increase. Further, achieving a TS of 590 MPa or more becomes difficult. On the other hand, when the annealing temperature exceeds 900° C., the ratio of austenite formation during heating in the two-phase region of ferrite and austenite becomes excessive. This reduces Mn concentration in austenite. Therefore, in the subsequent first cooling, transformation to pearlite occurs along with transformation to ferrite, and the area fraction of retained austenite decreases. As a result, ductility, strain hardenability in the low strain range, and strain hardenability in the high strain range are reduced. The annealing temperature is therefore 760° C. or more and 900° C. or less. The annealing temperature is preferably 780° C. or more. Further, the annealing temperature is preferably 880° C. or less. The annealing temperature is the maximum arrival temperature during the annealing.

Annealing time: 20 s or more When the annealing time is less than 20 s, the ratio of austenite formation during heating in the two-phase region of ferrite and austenite becomes insufficient, and the area fractions of bainitic ferrite and retained austenite are reduced. As a result, ductility, strain hardenability in the low strain range, and strain hardenability in the high strain range are reduced. Further, area fraction of ferrite and $S_F+S_{BF}$ increase. Accordingly, achieving a TS of 590 MPa or more may become difficult. The annealing time is therefore 20 s or more. An upper limit of the annealing time is not particularly limited. The annealing time is preferably 900 s or less. The annealing time is a holding time in a temperature range from (annealing temperature −40° C.) or more to the annealing temperature or less. That is, the annealing time includes not only the holding time at the annealing temperature, but also the time in the temperature range from (annealing temperature −40° C.) or more to the annealing temperature or less during heating and cooling before and after reaching the annealing temperature.

[First cooling]

The cold-rolled steel sheet annealed as described above is cooled to the first cooling stop temperature of 350° C. or more and 550° C. or less.

First cooling stop temperature $T_0$: 350° C. or more and 550° C. or less

When the first cooling stop temperature is less than 350° C., the area fraction of tempered martensite increases excessively and the area fraction of bainitic ferrite, the area fraction of retained austenite, and $S_{MA1}$ are reduced. As a result, ductility, strain hardenability in the low strain range, and strain hardenability in the high strain range are reduced. Further, in the subsequent coating, untransformed austenite decomposes into pearlite and carbides, and $S_{MA2}$ is reduced. This may reduce strain hardenability in the high strain range. On the other hand, when the first cooling stop temperature exceeds 550° C., the amount of bainitic ferrite formed in the subsequent first holding decreases and $S_{MA1}$ decreases. Further, as $S_{MA1}$ decreases, $S_{MA2}$ also decreases. This may reduce ductility, strain hardenability in the low strain range, and strain hardenability in the high strain range. Further, $S_{\gamma 2}/S_{\gamma 1}$ also decreases. The first cooling stop temperature is therefore 350° C. or more and 550° C. or less. The first cooling stop temperature is preferably 380° C. or more. The first cooling stop temperature is preferably 520° C. or less.

[First Holding]

The cold-rolled steel sheet is held at the temperature range from 350° C. or more to 550° C. or less (hereinafter also referred to as the first holding temperature range) for 3 s or more to 600 s or less.

Holding time in first holding temperature range: 3 s or more to 600 s or less

In the first holding, bainitic ferrite is formed and C diffusion from formed bainitic ferrite to untransformed austenite adjacent to the bainitic ferrite occurs. As a result, defined amounts for the area fraction of retained austenite and $S_{MA1}$ are secured.

Here, when holding time in the first holding temperature range is less than 3 s, the amount of bainitic ferrite formed in the first holding decreases, thereby reducing $S_{MA1}$. Further, as $S_{MA1}$ decreases, $S_{MA2}$ also decreases. As a result, ductility, strain hardenability in the low strain range, and strain hardenability in the high strain range are reduced. On the other hand, when holding time in the first holding temperature range exceeds 600 s, the amount of bainitic ferrite formed in the second holding, which is a subsequent process, decreases, and $S_{MA2}$ and $S_{\gamma 2}/S_{\gamma 1}$ decrease. Accordingly, strain hardenability in the high strain range decreases. Further, excessive C diffusion from bainitic ferrite to untransformed austenite occurs. Then, in the subsequent coating, untransformed austenite decomposes into pearlite and carbides, and $S_{MA1}$ is reduced. This may further reduce strain hardenability in the low strain range and in the high strain range. The holding time in the first holding temperature range is therefore 3 s or more to 600 s or less. The holding time in the first holding temperature range is preferably 5 s or more. The holding time in the first holding temperature range is more preferably 10 s or more. The holding time in the first holding temperature range is preferably less than 200 s. The holding time in the first holding temperature range is more preferably less than 80 s. The holding time in the first holding temperature range includes the time the cold-rolled steel sheet remains in the temperature range until reaching the first cooling stop temperature in the first cooling, and the time the cold-rolled steel sheet remains in the temperature range until the start of galvanizing treatment in the coating described below (for example, the time the cold-rolled steel sheet remains in the temperature range until dipped into the galvanizing bath). However, the holding time in the first holding temperature range does not include the time in the temperature range of the galvanized steel sheet after applying the galvanizing treatment in the coating.

[Coating]

The cold-rolled steel sheet is then subjected to a galvanizing treatment to produce a galvanized steel sheet. Examples of the galvanizing treatment include hot-dip galvanizing treatment and galvannealing treatment. In the coating, the relationship between the first cooling stop temperature in the first cooling and the temperature of the galvanizing bath in the galvanizing treatment (hereinafter also referred to as coating bath temperature) needs to satisfy the following Expression (1):

$$-120° \text{ C.} \leq T_0 - T_1 \leq 80° \text{ C.} \quad (1)$$

Here, $T_0$ is the first cooling stop temperature (° C.) and $T_1$ is the temperature of the galvanizing bath in the galvanizing treatment (° C.).

That is, from the viewpoint of securing excellent strain hardenability in both the low strain range and the high strain range, the difference between the first cooling stop temperature and the coating bath temperature needs to be appropriately controlled, and specifically, the relationship in Expression (1) needs to be satisfied. When $T_0-T_1$ is less than −120° C., $S_{MA1}$ decreases in the subsequent coating, and strain hardenability in the low strain range and strain hardenability in the high strain range are reduced. On the other hand, when $T_0-T_1$ exceeds 80° C., $S_{MA2}$ and $S_{\gamma2}/S_{\gamma1}$ decrease and strain hardenability in the high strain range decreases. $T_0-T_1$ is preferably −80° C. or more. $T_0-T_1$ is more preferably −70° C. or more. Further, $T_0-T_1$ is preferably 60° C. or less. $T_0-T_1$ is more preferably 50° C. or less.

Conditions other than the above are not particularly limited, and a conventional method may be used.

For example, in the case of hot-dip galvanizing treatment, after the cold-rolled steel sheet is immersed in the galvanizing bath, adjusting the coating weight by gas wiping or the like is preferable. The coating bath temperature is 440° C. or more and 500° C. or less. Further, as a galvanizing bath, there is no particular limitation as long as the composition of the galvanized layer is as described above. For example, a coating bath having an Al content of 0.10 mass % or more and 0.23 mass % or less with the balance being Zn and inevitable impurity is preferable.

Further, in the case of galvannealing treatment, after hot-dip galvanizing treatment is performed as described above, the galvanized steel sheet is preferably heated to an alloying temperature of 450° C. or more and 600° C. or less and subjected to an alloying treatment. When the alloying temperature is less than 450° C., the Zn—Fe alloying rate becomes slow and alloying may be difficult. On the other hand, when the alloying temperature exceeds 600° C., untransformed austenite may transform to pearlite, and TS, ductility, strain hardenability in the low strain range, and strain hardenability in the high strain range may decrease. The alloying temperature is more preferably 470° C. or more. The alloying temperature is more preferably 570° C. or less.

The coating weight for both a hot-dip galvanized steel sheet (GI) and a galvannealed steel sheet (GA) is preferably 20 g/m$^2$ to 80 g/m$^2$ per side. The coating weight may be adjusted by gas wiping and the like.

Additional holding may be performed before the second cooling described below and after or during the coating, in which the galvanized steel sheet is held at a temperature range from 280° C. or more to 550° C. or less (hereinafter also referred to as the additional holding temperature range) for 3 s or more to 600 s or less. In the case of galvannealing treatment as a coating treatment, the additional holding may be performed during the coating, that is, the coating may also serve as the additional holding. Further, when the additional holding is performed, the total of the holding time in the first holding temperature range and the holding time in the additional holding temperature range is preferably 3 s or more to 600 s or less, and the total of the holding time in the additional holding temperature range and the holding time in the second temperature range is preferably 3 s or more to 2000 s or less. The total of the holding time in the first holding temperature range and the holding time in the additional holding temperature range is more preferably less than 200 s. The total of the holding time in the additional holding temperature range and the holding time in the second holding temperature range is more preferably less than 1200 s.

[Second Cooling]

The galvanized steel sheet is then cooled to the second cooling stop temperature of 280° C. or more and 470° C. or less.

Second cooling stop temperature: 280° C. or more and 470° C. or less The second cooling is required to change the morphology of untransformed austenite and promote C enrichment in untransformed austenite by forming an appropriate amount of bainitic ferrite in the second holding, and thereby control $S_{MA2}$ and $S_{\gamma2}/S_{\gamma1}$ to within a defined range. Here, when the second cooling stop temperature is less than 280° C., an appropriate amount of bainitic ferrite is not formed in the subsequent second holding, and $S_{MA2}$ and $S_{\gamma2}/S_{\gamma1}$ decrease, and strain hardenability in the high strain range decreases. Further, hard fresh martensite and self-tempered martensite increase and ductility decreases. In addition, external release of hydrogen included in the base steel sheet becomes insufficient, resulting in an increase in the diffusible hydrogen content of the base steel sheet. This may result in reduced ductility. On the other hand, when the second cooling stop temperature exceeds 470° C., an appropriate amount of bainitic ferrite is not formed in the subsequent second holding, and $S_{MA2}$ and $S_{\gamma2}/S_{\gamma1}$ decrease, and strain hardenability in the high strain range decreases. Further, external release of hydrogen included in the base steel sheet becomes insufficient, resulting in an increase in the diffusible hydrogen content of the base steel sheet. This may result in reduced ductility. The second cooling stop temperature is therefore 280° C. or more and 470° C. or less. The second cooling stop temperature is preferably 300° C. or more. Further, the second cooling stop temperature is preferably 450° C. or less.

$$0° \text{ C.} \leq T_0 - T_2 \quad (2)$$

Further, In order to control $S_{MA2}$ and $S_{\gamma2}/S_{\gamma1}$ within the defined range, it is important to change the morphology of untransformed austenite and promote C enrichment in untransformed austenite by forming an appropriate amount of bainitic ferrite in the subsequent second holding. To achieve this, the second cooling stop temperature is required to be the first cooling stop temperature or less, that is, Expression (2) above needs to be satisfied. When $T_0-T_2$ is less than 0° C., formation of bainitic ferrite in the second holding is inhibited, $S_{MA2}$ and $S_{\gamma2}/S_{\gamma1}$ decrease, and strain hardenability in the high strain range decreases. $T_0-T_2$ is therefore 0° C. or more. $T_0-T_2$ is preferably 20° C. or more. $T_0-T_2$ is more preferably 30° C. or more. An upper limit of $T_0-T_2$ is not particularly limited. $T_0-T_2$ is preferably 200° C. or less. $T_0-T_2$ is more preferably 160° C. or less. Here, $T_0$ is the first cooling stop temperature (° C.) and $T_2$ is the second cooling stop temperature (° C.).

[Second holding]

The galvanized steel sheet is held at the temperature range from 280° C. or more to 470° C. or less (hereinafter also referred to as the second holding temperature range) for 10 s or more to 2000 s or less.

This changes the morphology of untransformed austenite present in the steel at the end of the second cooling to secure a defined amount of $S_{MA2}$. Further, by promoting C enrichment in untransformed austenite, $S_{\gamma2}/S_{\gamma1}$ may be controlled within a defined range.

Holding time in second holding temperature range: 10 s or more to 2000 s or less When holding time in the second holding temperature range is less than 10 s, an appropriate amount of bainitic ferrite is not formed in the second holding process, $S_{MA2}$ and $S_{\gamma2}/S_{\gamma1}$ decrease, and strain hardenability in the high strain range decreases. Further, external release of hydrogen included in the base steel sheet becomes insufficient, resulting in an increase in the diffusible hydrogen content of the base steel sheet. This may result in reduced ductility. On the other hand, when the holding time in the second holding temperature range exceeds 2000 s, untransformed austenite present in the steel at the end of the second cooling decomposes as carbides (pearlite). As a result, area fraction of retained austenite, $S_M$Ai, and $S_{MA2}$ are reduced, and ductility, strain hardenability in the low strain range, and strain hardenability in the high strain range are reduced. The holding time in the second holding temperature range is therefore 10 s or more to 2000 s or less. The holding time in the second holding temperature range is preferably 15 s or more. The holding time in the second holding temperature range is preferably 1200 s or less. The holding time in the second holding temperature range includes the time the galvanized steel sheet remains in the second holding temperature range after reaching the second cooling stop temperature as well as the time the galvanized steel sheet remains in the second holding temperature range until reaching the second cooling stop temperature in the second cooling.

Cooling conditions after holding in the second holding temperature range are not particularly limited, and a conventional method may be followed. For example, gas jet cooling, mist cooling, roll-chilling, water cooling, air cooling, and the like may be applied as a cooling method. Further, from the viewpoint of preventing surface oxidation, after holding the product in the second holding temperature range, cooling to 50° C. or less is preferable. Cooling to about room temperature is more preferable. For example, an average cooling rate of 1° C./s or more and 50° C./s or less in cooling after holding in the second holding temperature range is preferred.

The galvanized steel sheet obtained as described above may be further subjected to temper rolling. When the rolling reduction of the temper rolling exceeds 2.00%, yield stress may increase and dimensional accuracy may decrease when forming the galvanized steel sheet into a member. Therefore, the rolling reduction of the temper rolling is preferably 2.00% or less. A lower limit of the rolling reduction of the temper rolling is not particularly limited. From the viewpoint of productivity, the rolling reduction of the temper rolling is preferably 0.05% or more. The temper rolling may be performed on equipment that is continuous (on-line) with the annealing equipment used to perform each of the aforementioned processes, and may be performed on equipment that is discontinuous (off-line) with the annealing equipment used to perform each of the processes. The number of rolling cycles for the temper rolling may be one, two, or more. Processing by a leveler or the like is also acceptable, as long as an equivalent elongation rate to temper rolling is provided.

Conditions other than those described above are not particularly limited, and a conventional method may be used.

[4] Method of Producing Member

The following describes a method of producing a member according to an embodiment of the present disclosure.

The method of producing a member according to an embodiment of the present disclosure includes applying at least one of forming or joining to the galvanized steel sheet described above (for example, a galvanized steel sheet produced by the method of producing a galvanized steel sheet) to produce a member.

Here, a forming method is not particularly limited, and a typical processing method such as press working may be used, for example. Further, a joining method is also not particularly limited, and for example, typical welding such as spot welding, laser welding, arc welding, and the like, rivet joining, swaging joining, and the like may be used. Forming and joining conditions are not particularly limited and may follow a conventional method.

EXAMPLES

Steel material having the chemical compositions listed in Table 1 (the balance being Fe and inevitable impurity) was melted in a converter and made into steel slabs by a continuous casting method. The obtained steel slabs were heated to 1250° C. After heating, the steel slabs were hot rolled, consisting of rough rolling and finish rolling, to produce hot-rolled steel sheets. The hot-rolled steel sheets were then pickled and cold rolled (rolling reduction: 50%) to produce cold-rolled steel sheets having the thicknesses listed in Table 3. The obtained cold-rolled steel sheets were then subjected to the annealing, the first cooling, the first holding, the coating, the second cooling, and the second holding under conditions listed in Table 2 to obtain galvanized steel sheets. Here, in the coating, hot-dip galvanizing treatment or galvannealing treatment was performed to obtain hot-dip galvanized steel sheets (hereinafter also referred to as GI) or galvannealed steel sheets (hereinafter also referred to as GA). In Table 2, the type of coating is indicated as "GI" or "GA".

Further, in the case of producing GI, a galvanizing bath was used that had a composition of Al: 0.20 mass %, with the balance being Zn and inevitable impurity. In the case of producing GA, a coating bath was used that had a composition of Al: 0.14 mass %, with the balance being Zn and inevitable impurity.

The coating weight was 45 g/m$^2$ to 72 g/m$^2$ per side when producing GI and 45 g/m$^2$ per side when producing GA.

The composition of the galvanized layer of the final galvanized steel sheet in the case of GI was Fe: 0.1 mass % to 1.0 mass % and Al: 0.2 mass % to 1.0 mass %, with the balance being Zn and inevitable impurity. In the case of GA, the composition was Fe: 7 mass % to 15 mass % and Al: 0.1 mass % to 1.0 mass %, with the balance being Zn and inevitable impurity.

Galvanized layers were formed on both sides of the base steel sheet.

Using the galvanized steel sheets thus obtained, the steel microstructures of the base steel sheets were identified and the diffusible hydrogen content was measured, as described above. The measurement results are listed in Table 3. In Table 3, F is ferrite, BF is bainitic ferrite, TM is tempered martensite, RA is retained austenite, FM is fresh martensite, P is pearlite, and θ is cementite.

Further, tensile strength (TS), elongation after fracture (T-E1), strain hardening index in the low strain range ($n_1$), and strain hardening index in the high strain range ($n_2$) were evaluated according to the following criteria by conducting tensile testing and strain hardening index testing as follows.

TS
Pass: 590 MPa≤TS
Fail: TS<590 MPa

T-E1
Pass:
when 590 MPa≤TS<780 MPa, 32.0%≤T-E1
when 780 MPa≤TS<980 MPa, 22.0%≤T-E1
when 980 MPa≤TS, 16.0%≤T-E1
Fail:
when 590 MPa≤TS<780 MPa, 32.0%>T-E1
when 780 MPa≤TS<980 MPa, 22.0%>T-E1
when 980 MPa≤TS, 16.0%>T-E1

$n_1$
Pass:
when 590 MPa≤TS<780 MPa, 0.200 $n_1$
when 780 MPa≤TS<980 MPa, 0.180 $n_1$
when 980 MPa≤TS, 0.120>$n_1$
Fail:
when 590 MPa≤TS<780 MPa, 0.200>$n_1$
when 780 MPa≤TS<980 MPa, 0.180>$n_1$
when 980 MPa≤TS, 0.120>$n_1$ $n_2$
Pass, particularly excellent:
when 590 MPa≤TS<780 MPa, 0.190 $n_2$
when 780 MPa≤TS<980 MPa, 0.150 $n_2$
when 980 MPa≤TS, 0.100≤$n_2$
Pass, excellent:
when 590 MPa≤TS<780 MPa, 0.180 $n_2$<0.190
when 780 MPa≤TS<980 MPa, 0.140 $n_2$<0.150
when 980 MPa≤TS, 0.090 $n_2$<0.100
Fail:
when 590 MPa≤TS<780 MPa, 0.180>$n_2$
when 780 MPa≤TS<980 MPa, 0.140>$n_2$
when 980 MPa≤TS, 0.090>$n_2$ Tensile testing and strain hardening index testing were performed in accordance with JIS Z 2241 and JIS Z 2253. That is, a JIS No. 5 test piece was taken from the obtained galvanized steel sheet such that the longitudinal direction was perpendicular to the rolling direction of the base steel sheet. The collected test piece was subjected to tensile testing at a crosshead speed of 10 mm/min to measure TS, T-E1, U-E1, $n_1$, and $n_2$. $n_1$ was calculated by a two-point method from the strain and test force (stress) values at which the strain was 0.40 times and 0.80 times the uniform elongation (U-E1), $n_2$ was calculated by a two-point method from the strain and test force (stress) values at which the strain was 0.90 times and 0.95 times the uniform elongation (U-E1). The results are listed in Table 4.

TABLE 1

| Steel sample | Chemical composition (mass %) | | | | | | | |
|---|---|---|---|---|---|---|---|---|
| ID | C | Si | Mn | P | S | Al | N | Other |
| A | 0.074 | 1.52 | 1.56 | 0.011 | 0.0009 | 0.035 | 0.0032 | — |
| B | 0.130 | 1.44 | 1.92 | 0.010 | 0.0014 | 0.033 | 0.0030 | — |
| C | 0.115 | 0.93 | 2.21 | 0.019 | 0.0011 | 0.039 | 0.0031 | — |
| D | 0.083 | 1.38 | 2.77 | 0.008 | 0.0010 | 0.042 | 0.0029 | — |
| E | 0.125 | 1.23 | 1.88 | 0.014 | 0.0013 | 0.540 | 0.0033 | — |
| F | 0.134 | 0.04 | 2.41 | 0.023 | 0.0016 | 0.031 | 0.0039 | — |
| G | 0.078 | 3.35 | 1.16 | 0.019 | 0.0012 | 0.047 | 0.0035 | — |
| H | 0.140 | 1.67 | 0.76 | 0.018 | 0.0012 | 0.050 | 0.0038 | — |
| I | 0.068 | 0.60 | 3.92 | 0.022 | 0.0016 | 0.047 | 0.0025 | — |
| J | 0.101 | 1.30 | 2.10 | 0.023 | 0.0011 | 0.051 | 0.0009 | Ti: 0.032 |
| K | 0.133 | 1.30 | 2.02 | 0.013 | 0.0012 | 0.053 | 0.0025 | Nb: 0.021 |
| L | 0.124 | 1.44 | 1.99 | 0.018 | 0.0013 | 0.042 | 0.0015 | V: 0.033 |
| M | 0.117 | 1.68 | 1.94 | 0.024 | 0.0014 | 0.053 | 0.0044 | Ti: 0.023, B: 0.0016 |
| N | 0.113 | 1.49 | 2.10 | 0.019 | 0.0010 | 0.024 | 0.0042 | Cu: 0.20 |
| O | 0.082 | 1.09 | 1.14 | 0.014 | 0.0075 | 0.048 | 0.0055 | Cr: 0.41 |
| P | 0.072 | 1.13 | 1.02 | 0.024 | 0.0005 | 0.055 | 0.0027 | Ni: 0.69 |
| Q | 0.124 | 1.55 | 2.12 | 0.008 | 0.0009 | 0.049 | 0.0042 | Mo: 0.41 |
| R | 0.133 | 2.86 | 1.52 | 0.012 | 0.0009 | 0.058 | 0.0038 | Sb: 0.005 |
| S | 0.089 | 1.62 | 2.10 | 0.003 | 0.0006 | 0.039 | 0.0024 | Sn: 0.007 |
| T | 0.119 | 1.38 | 2.02 | 0.022 | 0.0008 | 0.048 | 0.0038 | Ta: 0.005 |
| U | 0.123 | 1.16 | 2.13 | 0.017 | 0.0011 | 0.047 | 0.0038 | W: 0.016 |
| V | 0.191 | 1.40 | 2.11 | 0.010 | 0.0015 | 0.033 | 0.0043 | Mg: 0.005 |
| W | 0.117 | 1.44 | 1.98 | 0.016 | 0.0017 | 0.038 | 0.0039 | Zn: 0.003 |
| X | 0.128 | 0.90 | 2.08 | 0.017 | 0.0011 | 0.028 | 0.0039 | Co: 0.008 |
| Y | 0.141 | 1.95 | 1.73 | 0.017 | 0.0013 | 0.050 | 0.0026 | Zr: 0.003 |
| Z | 0.119 | 1.53 | 1.92 | 0.019 | 0.0103 | 0.053 | 0.0021 | Ca: 0.004 |
| AA | 0.120 | 0.27 | 2.28 | 0.020 | 0.0011 | 0.031 | 0.0036 | Ce: 0.002 |
| AB | 0.107 | 1.21 | 2.05 | 0.087 | 0.0014 | 0.057 | 0.0027 | Se: 0.007 |
| AC | 0.096 | 1.69 | 1.96 | 0.016 | 0.0015 | 0.058 | 0.0039 | Te: 0.019 |
| AD | 0.122 | 0.44 | 2.21 | 0.017 | 0.0018 | 0.039 | 0.0033 | Ge: 0.015 |
| AE | 0.042 | 0.53 | 3.31 | 0.023 | 0.0013 | 0.045 | 0.0031 | As: 0.012 |
| AF | 0.165 | 1.24 | 2.23 | 0.010 | 0.0009 | 0.025 | 0.0042 | Sr: 0.010 |
| AG | 0.081 | 1.48 | 1.43 | 0.019 | 0.0010 | 0.030 | 0.0044 | Cs: 0.007 |
| AH | 0.121 | 0.82 | 2.34 | 0.023 | 0.0016 | 0.046 | 0.0017 | Hf: 0.004 |
| AI | 0.078 | 1.46 | 1.61 | 0.018 | 0.0009 | 0.025 | 0.0024 | Pb: 0.005 |
| AJ | 0.064 | 1.81 | 1.46 | 0.018 | 0.0009 | 0.031 | 0.0029 | Bi: 0.002 |
| AK | 0.127 | 1.60 | 1.97 | 0.006 | 0.0007 | 0.047 | 0.0038 | REM: 0.002 |

TABLE 2

| No. | Steel sample ID | Annealing: Annealing temp. (° C.) | Annealing: Annealing time (s) | First cooling: First cooling stop temp. $T_0$ (° C.) | First holding: Hold time (s) | Coating: Galvanizing bath temp. $T_1$ (° C.) | Coating: Type | Coating: Alloying temp. (° C.) | $T_0$-$T_1$ (° C.) | Second cooling: Second cooling stop temp. $T_2$ (° C.) | $T_0$-$T_2$ (° C.) | Second holding: Hold time (s) | Remarks |
|---|---|---|---|---|---|---|---|---|---|---|---|---|---|
| 1 | A | 860 | 90 | 490 | 15 | 460 | GA | 520 | 30 | 410 | 80 | 80 | Example |
| 2 | B | 850 | 110 | 430 | 110 | 470 | GA | 540 | −40 | 340 | 90 | 70 | Example |
| 3 | C | 800 | 100 | 440 | 60 | 465 | GI | — | −25 | 360 | 80 | 60 | Example |
| 4 | D | 840 | 120 | 480 | 50 | 470 | GA | 530 | 10 | 320 | 160 | 80 | Example |
| 5 | E | 900 | 60 | 450 | 70 | 475 | GA | 530 | −25 | 340 | 110 | 70 | Example |
| 6 | A | 950 | 80 | 450 | 30 | 460 | GA | 540 | −10 | 360 | 90 | 40 | Comparative Example |
| 7 | A | 740 | 100 | 460 | 70 | 465 | GA | 530 | −5 | 380 | 80 | 90 | Comparative Example |
| 8 | A | 790 | 3 | 430 | 20 | 460 | GA | 550 | −30 | 340 | 90 | 50 | Comparative Example |
| 9 | B | 840 | 120 | 600 | 10 | 480 | GA | 530 | 120 | 330 | 270 | 40 | Comparative Example |
| 10 | D | 850 | 110 | 210 | 20 | 455 | GA | 540 | −245 | 400 | −190 | 60 | Comparative Example |
| 11 | B | 880 | 70 | 470 | 1 | 470 | GI | — | 0 | 360 | 110 | 180 | Comparative Example |
| 12 | B | 870 | 40 | 420 | 1200 | 460 | GA | 560 | −40 | 350 | 70 | 70 | Comparative Example |
| 13 | A | 880 | 100 | 540 | 40 | 440 | GA | 540 | 100 | 360 | 180 | 120 | Comparative Example |
| 14 | B | 870 | 80 | 350 | 50 | 485 | GA | 560 | −135 | 330 | 20 | 50 | Comparative Example |
| 15 | B | 850 | 120 | 430 | 100 | 470 | GA | 530 | −40 | 500 | −70 | 20 | Comparative Example |
| 16 | B | 820 | 150 | 500 | 50 | 470 | GI | — | 30 | 150 | 350 | 30 | Comparative Example |
| 17 | B | 840 | 100 | 400 | 30 | 460 | GA | 540 | −60 | 450 | −50 | 40 | Comparative Example |
| 18 | C | 790 | 130 | 400 | 40 | 465 | GA | 510 | −65 | 330 | 70 | 3 | Comparative Example |
| 19 | C | 800 | 80 | 420 | 50 | 470 | GA | 520 | −50 | 320 | 100 | 3600 | Comparative Example |
| 20 | A | 850 | 160 | 470 | 40 | 460 | GA | 530 | 10 | 460 | 10 | 90 | Example |
| 21 | B | 820 | 140 | 400 | 50 | 460 | GA | 550 | −60 | 390 | 10 | 15 | Example |
| 22 | D | 830 | 110 | 470 | 40 | 470 | GA | 540 | 0 | 290 | 180 | 20 | Example |
| 23 | F | 780 | 150 | 450 | 20 | 460 | GA | 490 | −10 | 350 | 100 | 80 | Comparative Example |
| 24 | G | 790 | 60 | 420 | 40 | 455 | GI | — | −35 | 360 | 60 | 40 | Comparative Example |
| 25 | H | 860 | 90 | 450 | 30 | 470 | GA | 550 | −20 | 350 | 100 | 40 | Comparative Example |
| 26 | I | 840 | 80 | 450 | 40 | 470 | GA | 510 | −20 | 340 | 110 | 100 | Comparative Example |
| 27 | J | 830 | 70 | 440 | 60 | 470 | GA | 530 | −30 | 360 | 80 | 50 | Example |
| 28 | K | 820 | 320 | 420 | 15 | 490 | GA | 530 | −70 | 330 | 90 | 70 | Example |
| 29 | L | 840 | 110 | 440 | 160 | 450 | GI | — | −10 | 370 | 70 | 120 | Example |
| 30 | M | 850 | 40 | 450 | 80 | 475 | GA | 550 | −25 | 380 | 70 | 1200 | Example |
| 31 | N | 850 | 180 | 450 | 40 | 445 | GA | 520 | 5 | 350 | 100 | 60 | Example |
| 32 | O | 840 | 100 | 400 | 30 | 480 | GA | 530 | −80 | 390 | 10 | 10 | Example |
| 33 | P | 840 | 120 | 480 | 40 | 470 | GA | 540 | 10 | 340 | 140 | 70 | Example |
| 34 | Q | 860 | 120 | 470 | 300 | 465 | GA | 540 | 5 | 330 | 140 | 40 | Example |
| 35 | R | 870 | 70 | 350 | 10 | 470 | GA | 570 | −120 | 350 | 0 | 150 | Example |
| 36 | S | 840 | 120 | 380 | 80 | 450 | GA | 540 | −70 | 340 | 40 | 60 | Example |
| 37 | T | 870 | 20 | 440 | 50 | 440 | GA | 520 | 0 | 350 | 90 | 80 | Example |
| 38 | U | 820 | 90 | 470 | 20 | 465 | GI | — | 5 | 450 | 20 | 200 | Example |
| 39 | V | 860 | 100 | 420 | 70 | 460 | GA | 520 | −40 | 330 | 90 | 100 | Example |
| 40 | W | 840 | 120 | 500 | 100 | 470 | GI | — | 30 | 400 | 100 | 50 | Example |
| 41 | X | 790 | 140 | 500 | 180 | 455 | GA | 500 | 45 | 470 | 30 | 160 | Example |
| 42 | Y | 870 | 50 | 420 | 30 | 460 | GA | 590 | −40 | 370 | 50 | 2000 | Example |
| 43 | Z | 850 | 100 | 470 | 600 | 465 | GA | 530 | 5 | 350 | 120 | 90 | Example |
| 44 | AA | 760 | 150 | 500 | 20 | 450 | GA | 470 | 50 | 420 | 80 | 20 | Example |
| 45 | AB | 820 | 130 | 400 | 40 | 470 | GA | 530 | −70 | 360 | 40 | 80 | Example |
| 46 | AC | 870 | 60 | 430 | 30 | 475 | GA | 540 | −45 | 340 | 90 | 60 | Example |
| 47 | AD | 780 | 140 | 450 | 40 | 440 | GA | 450 | 10 | 400 | 50 | 20 | Example |
| 48 | AE | 800 | 120 | 430 | 240 | 460 | GI | — | −30 | 300 | 130 | 180 | Example |
| 49 | AF | 820 | 90 | 400 | 150 | 465 | GI | — | −65 | 280 | 120 | 200 | Example |
| 50 | AG | 860 | 180 | 550 | 5 | 470 | GA | 540 | 80 | 400 | 150 | 50 | Example |
| 51 | AH | 860 | 120 | 450 | 200 | 455 | GA | 490 | −5 | 350 | 100 | 100 | Example |
| 52 | AI | 830 | 160 | 520 | 3 | 460 | GI | — | 60 | 380 | 140 | 70 | Example |
| 53 | AJ | 880 | 100 | 420 | 40 | 470 | GA | 520 | −50 | 390 | 30 | 60 | Example |
| 54 | AK | 860 | 140 | 450 | 120 | 465 | GA | 540 | −15 | 330 | 120 | 15 | Example |

TABLE 3

| | | | Steel microstructure | | | | | | | | | | | | Diffusible hydrogen content | |
|---|---|---|---|---|---|---|---|---|---|---|---|---|---|---|---|---|
| | | | Area fraction of each phase | | | | | | | | | | | | | |
| No. | Steel sample ID | Thickness (mm) | F (%) | B (%) | TM (%) | RA (%) | FM (%) | $S_F + S_{BF}$ (%) | $S_{MA1}$ (%) | $S_{MA2}$ (%) | Residual micro-structure | $S_{\gamma1}$ (%) | $S_{\gamma2}$ (%) | $S_{\gamma2}/S_{\gamma1}$ | (mass ppm) | Remarks |
| 1 | A | 1.4 | 71.6 | 12.9 | 0.0 | 5.6 | 8.9 | 84.5 | 9.5 | 4.2 | θ, P | 3.9 | 2.0 | 0.51 | 0.14 | Example |
| 2 | B | 1.8 | 66.7 | 17.8 | 0.0 | 12.1 | 3.2 | 84.5 | 12.8 | 3.8 | θ | 7.4 | 2.2 | 0.30 | 0.07 | Example |
| 3 | C | 1.6 | 63.1 | 24.1 | 0.0 | 9.2 | 3.4 | 87.2 | 9.6 | 2.9 | θ | 3.1 | 0.5 | 0.16 | 0.08 | Example |
| 4 | D | 1.2 | 44.2 | 16.3 | 16.8 | 5.3 | 17.3 | 60.5 | 12.5 | 8.2 | θ | 2.1 | 0.5 | 0.24 | 0.07 | Example |
| 5 | E | 1.0 | 63.8 | 22.1 | 0.0 | 10.0 | 3.9 | 85.9 | 12.0 | 3.2 | θ | 6.5 | 1.3 | 0.20 | 0.06 | Example |
| 6 | A | 1.4 | 79.2 | 6.3 | 0.0 | 1.3 | 4.3 | 85.5 | 0.3 | 0.1 | θ, P | 1.1 | 0.7 | 0.64 | 0.07 | Comparative Example |
| 7 | A | 1.2 | 96.2 | 0.0 | 0.0 | 0.6 | 0.0 | 96.2 | 0.6 | 0.0 | θ, P | 0.5 | 0.3 | 0.60 | 0.16 | Comparative Example |
| 8 | A | 1.6 | 95.7 | 0.0 | 0.0 | 1.3 | 0.0 | 95.7 | 0.4 | 0.0 | θ, P | 1.1 | 0.8 | 0.73 | 0.06 | Comparative Example |
| 9 | B | 1.6 | 65.1 | 22.1 | 0.0 | 4.6 | 3.8 | 87.2 | 3.1 | 0.8 | θ, P | 2.8 | 0.3 | 0.11 | 0.04 | Comparative Example |
| 10 | D | 1.2 | 33.6 | 2.1 | 51.2 | 2.4 | 4.3 | 35.7 | 2.8 | 0.7 | θ, P | 1.1 | 0.2 | 0.18 | 0.13 | Comparative Example |
| 11 | B | 1.2 | 57.4 | 20.8 | 0.0 | 7.7 | 13.2 | 78.2 | 2.9 | 1.5 | θ | 3.2 | 0.2 | 0.06 | 0.07 | Comparative Example |
| 12 | B | 1.6 | 58.1 | 28.7 | 0.0 | 5.2 | 1.8 | 86.8 | 3.2 | 1.0 | θ, P | 4.5 | 0.1 | 0.02 | 0.05 | Comparative Example |
| 13 | A | 1.4 | 70.2 | 18.7 | 0.0 | 8.2 | 2.5 | 88.9 | 5.2 | 0.9 | θ, P | 3.3 | 0.4 | 0.12 | 0.09 | Comparative Example |
| 14 | B | 1.4 | 57.8 | 33.5 | 0.0 | 4.1 | 1.3 | 91.3 | 2.2 | 1.1 | θ, P | 3.6 | 0.2 | 0.06 | 0.06 | Comparative Example |
| 15 | B | 1.0 | 64.5 | 13.8 | 0.0 | 4.4 | 17.3 | 78.3 | 8.4 | 0.9 | — | 3.4 | 0.1 | 0.03 | 0.98 | Comparative Example |
| 16 | B | 0.8 | 67.2 | 4.3 | 0.0 | 4.0 | 24.5 | 71.5 | 6.7 | 0.7 | — | 2.8 | 0.1 | 0.04 | 0.73 | Comparative Example |
| 17 | B | 1.6 | 66.4 | 19.2 | 0.0 | 5.5 | 8.2 | 85.6 | 8.5 | 0.8 | θ, P | 5.1 | 0.3 | 0.06 | 0.70 | Comparative Example |
| 18 | C | 0.8 | 64.2 | 20.3 | 0.0 | 6.7 | 8.7 | 84.5 | 10.2 | 0.6 | θ | 3.1 | 0.2 | 0.06 | 0.81 | Comparative Example |
| 19 | C | 1.2 | 63.0 | 29.5 | 0.0 | 2.1 | 2.3 | 92.5 | 2.5 | 0.3 | θ, P | 2.0 | 0.1 | 0.05 | 0.01 | Comparative Example |
| 20 | A | 1.6 | 70.7 | 13.2 | 0.0 | 4.1 | 9.8 | 83.9 | 9.6 | 1.9 | θ, P | 3.3 | 0.3 | 0.09 | 0.19 | Example |
| 21 | B | 1.4 | 69.2 | 15.3 | 0.0 | 9.3 | 3.4 | 84.5 | 11.4 | 1.6 | θ, P | 6.7 | 0.6 | 0.09 | 0.06 | Example |
| 22 | D | 1.4 | 47.7 | 17.0 | 19.8 | 4.1 | 11.2 | 64.7 | 14.1 | 1.5 | θ | 2.7 | 0.1 | 0.04 | 0.05 | Example |
| 23 | F | 1.2 | 70.6 | 23.0 | 0.0 | 0.8 | 2.2 | 93.6 | 0.1 | 0.0 | θ, P | 0.6 | 0.3 | 0.50 | 0.08 | Comparative Example |
| 24 | G | 1.4 | 92.7 | 5.2 | 0.0 | 1.8 | 0.3 | 97.9 | 0.1 | 0.0 | — | 1.5 | 1.1 | 0.73 | 0.11 | Comparative Example |
| 25 | H | 1.6 | 93.1 | 4.3 | 0.0 | 0.3 | 0.0 | 97.4 | 0.0 | 0.0 | θ, P | 0.3 | 0.2 | 0.67 | 0.04 | Comparative Example |
| 26 | I | 1.0 | 22.7 | 0.0 | 35.7 | 0.0 | 41.6 | 22.7 | 2.0 | 0.5 | — | — | — | — | 0.08 | Comparative Example |
| 27 | J | 1.2 | 67.4 | 18.3 | 0.0 | 10.4 | 3.6 | 85.7 | 10.2 | 3.3 | θ | 5.9 | 1.7 | 0.29 | 0.09 | Example |
| 28 | K | 1.2 | 65.3 | 22.1 | 0.0 | 8.9 | 2.9 | 87.4 | 8.4 | 2.5 | θ | 5.0 | 1.2 | 0.24 | 0.06 | Example |
| 29 | L | 1.2 | 65.1 | 19.5 | 0.0 | 11.0 | 4.1 | 84.6 | 14.3 | 2.8 | θ | 8.2 | 1.3 | 0.16 | 0.12 | Example |
| 30 | M | 1.4 | 63.3 | 22.7 | 0.0 | 12.3 | 0.7 | 86.0 | 11.3 | 3.7 | θ | 6.3 | 1.7 | 0.27 | 0.15 | Example |
| 31 | N | 1.4 | 66.2 | 21.0 | 0.0 | 9.4 | 3.2 | 87.2 | 8.6 | 4.0 | θ | 5.3 | 1.6 | 0.30 | 0.04 | Example |
| 32 | O | 1.6 | 79.7 | 13.8 | 0.0 | 3.2 | 2.6 | 93.5 | 4.2 | 1.6 | θ, P | 2.5 | 0.4 | 0.16 | 0.47 | Example |
| 33 | P | 1.6 | 79.4 | 8.7 | 0.0 | 6.1 | 4.7 | 88.1 | 8.6 | 3.5 | θ, P | 3.7 | 1.1 | 0.30 | 0.10 | Example |
| 34 | Q | 1.4 | 66.9 | 20.6 | 0.0 | 8.5 | 3.6 | 87.5 | 11.4 | 3.1 | θ | 6.6 | 1.6 | 0.24 | 0.06 | Example |

TABLE 3-continued

| | | | Steel microstructure | | | | | | | | | | | | Diffusible hydrogen content | |
|---|---|---|---|---|---|---|---|---|---|---|---|---|---|---|---|---|
| | Steel sample | Thick-ness | Area fraction of each phase | | | | | $S_F$ + | | | Residual | | | | content | |
| No. | ID | (mm) | F (%) | B (%) | TM (%) | RA (%) | FM (%) | $S_{BF}$ (%) | $S_{MA1}$ (%) | $S_{MA2}$ (%) | micro-structure | $S_{\gamma1}$ (%) | $S_{\gamma2}$ (%) | $S_{\gamma2}$/ $S_{\gamma1}$ | (mass ppm) | Remarks |
| 35 | R | 0.8 | 59.0 | 27.1 | 0.0 | 9.2 | 3.4 | 86.1 | 8.6 | 2.8 | θ, P | 5.1 | 1.5 | 0.29 | 0.02 | Example |
| 36 | S | 1.6 | 69.4 | 18.2 | 0.0 | 8.9 | 3.0 | 87.6 | 11.4 | 3.9 | θ, P | 6.4 | 2.0 | 0.31 | 0.04 | Example |
| 37 | T | 2.0 | 48.3 | 38.7 | 0.0 | 9.3 | 3.5 | 87.0 | 10.5 | 4.1 | θ | 6.1 | 2.2 | 0.36 | 0.09 | Example |
| 38 | U | 1.6 | 67.2 | 19.8 | 0.0 | 8.8 | 4.2 | 87.0 | 8.8 | 2.9 | — | 5.1 | 1.5 | 0.29 | 0.37 | Example |
| 39 | V | 1.2 | 20.2 | 54.1 | 4.7 | 13.0 | 7.2 | 74.3 | 18.2 | 10.5 | θ | 4.4 | 1.5 | 0.34 | 0.07 | Example |
| 40 | W | 0.4 | 69.1 | 12.4 | 0.0 | 8.1 | 10.2 | 81.5 | 4.3 | 1.6 | θ | 2.7 | 0.3 | 0.11 | 0.17 | Example |
| 41 | X | 1.0 | 74.1 | 14.5 | 0.0 | 8.2 | 3.1 | 88.6 | 7.6 | 2.8 | θ | 3.9 | 1.0 | 0.26 | 0.02 | Example |
| 42 | Y | 3.0 | 64.4 | 22.3 | 0.0 | 12.8 | 0.0 | 86.7 | 10.3 | 6.5 | θ | 8.0 | 3.4 | 0.43 | 0.15 | Example |
| 43 | Z | 1.2 | 65.0 | 19.9 | 0.0 | 10.4 | 4.5 | 84.9 | 12.8 | 3.6 | θ | 7.2 | 2.0 | 0.28 | 0.06 | Example |
| 44 | AA | 2.4 | 78.1 | 11.0 | 0.0 | 7.2 | 3.3 | 89.1 | 6.5 | 2.1 | θ | 4.0 | 0.8 | 0.20 | 0.38 | Example |
| 45 | AB | 1.6 | 67.2 | 20.2 | 0.0 | 9.5 | 3.0 | 87.4 | 8.4 | 3.0 | θ | 5.1 | 1.6 | 0.31 | 0.13 | Example |
| 46 | AC | 1.8 | 55.8 | 30.8 | 0.0 | 9.3 | 3.9 | 86.6 | 11.6 | 3.7 | θ | 5.0 | 1.4 | 0.28 | 0.11 | Example |
| 47 | AD | 1.6 | 75.4 | 13.3 | 0.0 | 6.8 | 3.6 | 88.7 | 8.2 | 2.0 | θ | 4.9 | 1.0 | 0.20 | 0.33 | Example |
| 48 | AE | 1.4 | 62.2 | 10.3 | 12.7 | 6.2 | 7.6 | 72.5 | 8.7 | 4.2 | θ | 3.2 | 0.5 | 0.16 | 0.01 | Example |
| 49 | AF | 1.4 | 48.3 | 15.8 | 19.7 | 4.6 | 11.3 | 64.1 | 6.3 | 2.7 | θ | 1.7 | 0.2 | 0.12 | 0.03 | Example |
| 50 | AG | 1.6 | 82.6 | 10.2 | 0.0 | 4.2 | 2.3 | 92.8 | 4.5 | 1.9 | θ, P | 3.5 | 0.5 | 0.14 | 0.18 | Example |
| 51 | AH | 1.4 | 27.9 | 59.1 | 0.0 | 7.9 | 5.0 | 87.0 | 11.2 | 4.9 | θ | 7.1 | 2.6 | 0.37 | 0.06 | Example |
| 52 | AI | 1.0 | 88.1 | 6.1 | 0.0 | 4.0 | 1.4 | 94.2 | 4.4 | 2.9 | θ | 3.0 | 1.1 | 0.37 | 0.14 | Example |
| 53 | AJ | 1.6 | 65.3 | 25.2 | 0.0 | 5.2 | 3.5 | 90.5 | 7.7 | 3.0 | θ, P | 3.6 | 1.2 | 0.33 | 0.15 | Example |
| 54 | AK | 1.2 | 58.2 | 28.2 | 0.0 | 9.7 | 3.6 | 86.4 | 12.2 | 3.6 | θ | 7.1 | 1.8 | 0.25 | 0.11 | Example |

TABLE 4

| No. | Steel sample ID | TS (MPa) | T-El (%) | U-El (%) | $n_1$ | $n_2$ | Type | Remarks |
|---|---|---|---|---|---|---|---|---|
| 1 | A | 634 | 40.6 | 25.0 | 0.259 | 0.228 | GA | Example |
| 2 | B | 803 | 32.6 | 19.2 | 0.224 | 0.183 | GA | Example |
| 3 | C | 807 | 30.4 | 16.9 | 0.205 | 0.165 | GI | Example |
| 4 | D | 1124 | 16.8 | 10.3 | 0.148 | 0.116 | GA | Example |
| 5 | E | 812 | 27.5 | 17.2 | 0.222 | 0.173 | GA | Example |
| 6 | A | 506 | 28.1 | 14.4 | 0.207 | 0.141 | GA | Comparative Example |
| 7 | A | 432 | 38.2 | 20.4 | 0.203 | 0.144 | GA | Comparative Example |
| 8 | A | 446 | 36.6 | 19.7 | 0.210 | 0.134 | GA | Comparative Example |
| 9 | B | 803 | 20.3 | 12.2 | 0.166 | 0.124 | GA | Comparative Example |
| 10 | D | 957 | 15.6 | 9.6 | 0.103 | 0.076 | GA | Comparative Example |
| 11 | B | 878 | 22.7 | 13.8 | 0.162 | 0.124 | GI | Comparative Example |
| 12 | B | 786 | 23.0 | 14.3 | 0.165 | 0.118 | GA | Comparative Example |
| 13 | A | 881 | 22.4 | 15.2 | 0.196 | 0.118 | GA | Comparative Example |
| 14 | B | 792 | 22.3 | 13.2 | 0.159 | 0.121 | GA | Comparative Example |
| 15 | B | 825 | 20.1 | 14.8 | 0.204 | 0.120 | GA | Comparative Example |
| 16 | B | 890 | 19.8 | 13.9 | 0.191 | 0.118 | GI | Comparative Example |
| 17 | B | 789 | 23.2 | 14.6 | 0.225 | 0.127 | GA | Comparative Example |
| 18 | C | 834 | 20.5 | 15.6 | 0.196 | 0.130 | GA | Comparative Example |
| 19 | C | 786 | 18.4 | 7.5 | 0.124 | 0.099 | GA | Comparative Example |
| 20 | A | 641 | 34.2 | 22.1 | 0.238 | 0.183 | GA | Example |
| 21 | B | 799 | 28.1 | 17.9 | 0.228 | 0.141 | GA | Example |
| 22 | D | 1067 | 17.6 | 10.2 | 0.136 | 0.094 | GA | Example |
| 23 | F | 745 | 21.7 | 9.3 | 0.176 | 0.125 | GA | Comparative Example |
| 24 | G | 482 | 34.2 | 20.1 | 0.215 | 0.163 | GI | Comparative Example |

TABLE 4-continued

| No. | Steel sample ID | TS (MPa) | T-El (%) | U-El (%) | $n_1$ | $n_2$ | Type | Remarks |
|---|---|---|---|---|---|---|---|---|
| 25 | H | 412 | 40.5 | 21.3 | 0.220 | 0.141 | GA | Comparative Example |
| 26 | I | 1158 | 10.2 | 9.8 | 0.103 | 0.065 | GA | Comparative Example |
| 27 | J | 812 | 26.1 | 17.5 | 0.210 | 0.177 | GA | Example |
| 28 | K | 835 | 24.2 | 16.0 | 0.211 | 0.162 | GA | Example |
| 29 | L | 822 | 26.6 | 17.2 | 0.243 | 0.166 | GI | Example |
| 30 | M | 788 | 29.8 | 18.3 | 0.219 | 0.180 | GA | Example |
| 31 | N | 848 | 27.4 | 16.9 | 0.201 | 0.188 | GA | Example |
| 32 | O | 613 | 32.4 | 20.5 | 0.206 | 0.196 | GA | Example |
| 33 | P | 622 | 35.7 | 22.4 | 0.243 | 0.212 | GA | Example |
| 34 | Q | 878 | 26.3 | 16.1 | 0.220 | 0.178 | GA | Example |
| 35 | R | 791 | 26.1 | 18.1 | 0.204 | 0.154 | GA | Example |
| 36 | S | 821 | 28.4 | 16.7 | 0.219 | 0.186 | GA | Example |
| 37 | T | 819 | 30.0 | 18.4 | 0.216 | 0.188 | GA | Example |
| 38 | U | 802 | 27.1 | 17.3 | 0.218 | 0.169 | GI | Example |
| 39 | V | 1003 | 20.4 | 13.2 | 0.158 | 0.135 | GA | Example |
| 40 | W | 810 | 22.8 | 18.0 | 0.183 | 0.152 | GI | Example |
| 41 | X | 814 | 25.8 | 16.8 | 0.201 | 0.167 | GA | Example |
| 42 | Y | 782 | 34.1 | 20.5 | 0.245 | 0.199 | GA | Example |
| 43 | Z | 810 | 28.5 | 19.2 | 0.230 | 0.180 | GA | Example |
| 44 | AA | 799 | 23.1 | 11.0 | 0.202 | 0.156 | GA | Example |
| 45 | AB | 797 | 28.7 | 17.9 | 0.209 | 0.174 | GA | Example |
| 46 | AC | 794 | 29.3 | 18.4 | 0.221 | 0.185 | GA | Example |
| 47 | AD | 809 | 25.2 | 15.7 | 0.204 | 0.161 | GA | Example |
| 48 | AE | 1021 | 17.2 | 10.7 | 0.133 | 0.116 | GI | Example |
| 49 | AF | 1045 | 16.4 | 9.8 | 0.126 | 0.104 | GI | Example |
| 50 | AG | 627 | 33.5 | 21.0 | 0.211 | 0.199 | GA | Example |
| 51 | AH | 842 | 25.0 | 14.5 | 0.217 | 0.196 | GA | Example |
| 52 | AI | 634 | 34.1 | 21.6 | 0.232 | 0.211 | GI | Example |
| 53 | AJ | 625 | 36.4 | 22.7 | 0.237 | 0.194 | GA | Example |
| 54 | AK | 837 | 28.4 | 17.4 | 0.225 | 0.185 | GA | Example |

As indicated in Table 4, tensile strength (TS), elongation after fracture (T-E1), strain hardening index in the low strain range ($n_1$), and strain hardening index in the high strain range ($n_2$) were all acceptable in each of the Examples. Further, tensile strength (TS), elongation after fracture (T-E1), strain hardening index in the low strain range ($n_1$), and strain hardening index in the high strain range ($n_2$) were all excellent for the members obtained by forming and the members obtained by joining using the steel sheets of the Examples.

On the other hand, at least one of tensile strength (TS), elongation after fracture (T-E1), strain hardening index in the low strain range ($n_1$), or strain hardening index in the high strain range ($n_2$) were not sufficient in each of the Comparative Examples.

The invention claimed is:

1. A galvanized steel sheet comprising a base steel sheet and a galvanized layer on a surface of the base steel sheet, wherein the base steel sheet comprises:

a chemical composition containing, in mass %,

C: 0.040% or more and 0.200% or less,

Si: 0.20% or more and 3.00% or less,

Mn: 1.00% or more and less than 3.50%,

P: 0.001% or more and 0.100% or less,

S: 0.0200% or less,

Al: 0.005% or more and 2.000% or less,

N: 0.0100% or less,

Ti: 0.200% or less, including 0%,

Nb: 0.200% or less, including 0%,

V: 0.100% or less, including 0%,

B: 0.0100% or less, including 0%,

Cu: 1.000% or less, including 0%,

Cr: 1.000% or less, including 0%,

Ni: 1.000% or less, including 0%,

Mo: 0.500% or less, including 0%,

Sb: 0.200% or less, including 0%,

Sn: 0.200% or less, including 0%,

Ta: 0.100% or less, including 0%,

W: 0.500% or less, including 0%,

Mg: 0.0200% or less, including 0%,

Zn: 0.0200% or less, including 0%,

Co: 0.0200% or less, including 0%,

Zr: 0.0200% or less, including 0%,

Ca: 0.0200% or less, including 0%,

Ce: 0.0200% or less, including 0%,

Se: 0.0200% or less, including 0%,

Te: 0.0200% or less, including 0%,

Ge: 0.0200% or less, including 0%,

As: 0.0200% or less, including 0%,

Sr: 0.0200% or less, including 0%,

Cs: 0.0200% or less, including 0%,

Hf: 0.0200% or less, including 0%,

Pb: 0.0200% or less, including 0%,

Bi: 0.0200% or less, including 0%, and

REM: 0.0200% or less, including 0%, with the balance being Fe and inevitable impurities, the steel microstructure of the base steel sheet comprises:

area fraction of ferrite: 20.0% or more and 90.0% or less, area fraction of bainitic ferrite: 4.0% or more and 60.0% or less, area fraction of tempered martensite: 20.0% or less, including 0%, area fraction of retained austenite: 3.0% or more, area fraction of fresh martensite: 20.0% or less, including 0%, SF+SBF: 55.0% or more and 95.0% or less, SMA1: 4.0% or more, and SMA2: 1.5% or more, wherein tensile strength is 590 MPa or more, where $S_F$ is area fraction of ferrite, $S_{BF}$ is area fraction of bainitic ferrite, $S_{MA1}$ is area fraction of the sum of island regions of hard secondary phase consisting of retained austenite and fresh martensite having a circularity of 0.40 or less, and $S_{MA2}$ is area fraction of the sum of island regions of hard secondary phase consisting of retained austenite and fresh martensite having a circularity of 0.20 or less and an aspect ratio of 4.0 or less, and wherein the area fractions of ferrite, bainitic ferrite, tempered martensite, retained austenite, and fresh martensite are measured at a ¼ sheet thickness position of the base steel sheet.

2. A member made of the galvanized steel sheet according to claim 1.

3. The galvanized steel sheet according to claim 1, wherein the galvanized steel sheet satisfies at least one selected from following (a), (b) and (c), (a) $S_{\gamma 2}/S_{\gamma 1}$ is 0.10 or more in the steel microstructure of the base steel sheet, where $S_{\gamma 1}$ is area fraction of retained austenite having a solute C concentration of 0.70% or more, and $S_{\gamma 2}$ is area fraction of retained austenite having a solute C concentration of 0.85% or more, (b) diffusible hydrogen content of the base steel sheet is 0.50 mass ppm or less, and (c) the galvanized layer is a hot-dip galvanized layer or a galvannealed layer.

4. A member made of the galvanized steel sheet according to claim 3.

5. A method of producing the galvanized steel sheet according to claim 1, the method comprising:

hot rolling a steel slab having the chemical composition according to claim 1 to produce a hot-rolled steel sheet;

cold rolling the hot-rolled steel sheet to produce a cold-rolled steel sheet;

annealing the cold-rolled steel sheet at an annealing temperature of 760° C. or more and 900° C. or less for an annealing time of 20 s or more;

cooling the cold-rolled steel sheet to a first cooling stop temperature of 350° C. or more and 550° C. or less;

holding the cold-rolled steel sheet at a temperature range of 350° C. or more and 550° C. or less for 3 s or more to 600 s or less;

coating the cold-rolled steel sheet by a galvanizing treatment to produce a galvanized steel sheet, wherein the galvanizing treatment is a hot-dip galvanizing treatment or a galvannealing treatment;

cooling the galvanized steel sheet to a second cooling stop temperature of 280° C. or more and 470° C. or less; and holding the galvanized steel sheet at a temperature range of 280° C. or more and 470° C. or less for 10 s or more to 2000 s or less, wherein the first cooling stop temperature, temperature of a galvanizing bath in the galvanizing treatment, and the second cooling stop temperature satisfy the following Expression (1) and Expression (2)

$$-120° \text{ C.} \leq T_0-T_1 \leq 80° \text{ C.} \ldots \quad (1)$$

$$0° \text{ C.} \leq T_0-T_2 \ldots \quad (2)$$

where $T_0$ is the first cooling stop temperature in ° C., $T_1$ is the temperature of the galvanizing bath in the galvanizing treatment in ° C., and $T_2$ is the second cooling stop temperature in ° C.

6. A method of producing a member, wherein the galvanized steel sheet according to claim 1 is subjected to at least one of a forming process or a joining process to produce the member.

7. A method of producing a member, wherein the galvanized steel sheet according to claim 3 is subjected to at least one of a forming process or a joining process to produce the member.

* * * * *